US011915577B2

(12) United States Patent
Motohashi

(10) Patent No.: US 11,915,577 B2
(45) Date of Patent: Feb. 27, 2024

(54) INFORMATION PROCESSING APPARATUS, METHOD FOR PROCESSING EMERGENCY NOTIFICATION, AND PROGRAM

(71) Applicant: NEC Corporation, Tokyo (JP)

(72) Inventor: Teruyuki Motohashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 17/746,274

(22) Filed: May 17, 2022

(65) Prior Publication Data

US 2022/0375329 A1 Nov. 24, 2022

(30) Foreign Application Priority Data

May 21, 2021 (JP) ................. 2021-085835

(51) Int. Cl.
*G08B 25/01* (2006.01)
*G06F 3/14* (2006.01)
*G06F 3/01* (2006.01)
*G02B 27/01* (2006.01)
*A42B 3/30* (2006.01)
*G08B 25/10* (2006.01)

(52) U.S. Cl.
CPC ............. *G08B 25/016* (2013.01); *A42B 3/30* (2013.01); *G02B 27/0172* (2013.01); *G06F 3/012* (2013.01); *G06F 3/14* (2013.01); *G08B 25/10* (2013.01); *G02B 2027/014* (2013.01)

(58) Field of Classification Search
CPC ........ G08B 25/016; G08B 25/10; A42B 3/30; G02B 27/0172; G02B 2027/014; G06F 3/012
See application file for complete search history.

(56) References Cited

U.S. PATENT DOCUMENTS

| 10,786,693 | B1 * | 9/2020 | Opperman | ............. A62B 18/02 |
| 11,113,942 | B1 * | 9/2021 | Wade | ..................... G08B 31/00 |
| 2004/0131498 | A1 * | 7/2004 | Kuutti | .................. G08B 21/182 |
|  |  |  |  | 422/83 |
| 2008/0023002 | A1 * | 1/2008 | Guelzow | ................ A62B 18/08 |
|  |  |  |  | 2/5 |

FOREIGN PATENT DOCUMENTS

JP 2007-166472 A 6/2007

* cited by examiner

*Primary Examiner* — Hongmin Fan

(57) ABSTRACT

An information processing apparatus, a method for processing an emergency notification, and a program capable of enabling, when an emergency situation for a worker occurs, the worker to accurately recognize a state of issuance of an emergency notification are provided. An information processing apparatus includes a notification transmitting unit configured to transmit an emergency notification when a predetermined condition is satisfied, the emergency notification being a notification for reporting an occurrence of an emergency situation for a worker, and a display control unit configured to perform control so as to display information about the emergency notification on a head-mounted display.

11 Claims, 22 Drawing Sheets

INFORMATION PROCESSING APPARATUS, METHOD FOR PROCESSING EMERGENCY NOTIFICATION, AND PROGRAM

INCORPORATION BY REFERENCE

This application is based upon and claims the benefit of priority from Japanese patent application No. 2021-085835, filed on May 21, 2021, the disclosure of which is incorporated herein in its entirety by reference.

TECHNICAL FIELD

The present disclosure relates to an information processing apparatus, a method for processing an emergency notification, and a program.

BACKGROUND ART

Technologies for reporting the occurrence of an emergency situation for workers have been proposed. For example, Japanese Unexamined Patent Application Publication No. 2007-166472 discloses a system that outputs, when a member of a team or the like engaged in firefighting, lifesaving, or a similar work has become involved in some kind of emergency situation, a sound from a speaker attached to the member who has become involved in the emergency situation. Further, in this system, a firefighter is notified of the presence of another firefighter who is asking for help in his/her vicinity by vibrations of a vibrator.

SUMMARY

In the technology disclosed in Japanese Unexamined Patent Application Publication No. 2007-166472, the firefighter perceives the occurrence of an emergency situation as he/she senses vibrations generated by the vibrator with his/her body. However, there is a possibility that the firefighter cannot perceive the vibrations of the vibrator when, for example, he/she is moving his/her body during his/her work.

Therefore, an example object of the disclosure is to provide an information processing apparatus, a method for processing an emergency notification, and a program capable of enabling, when an emergency situation for a worker occurs, the worker to accurately recognize a state of issuance of an emergency notification.

In a first example aspect, an information processing apparatus includes:
- a notification transmitting unit configured to transmit an emergency notification when a predetermined condition is satisfied, the emergency notification being a notification for reporting an occurrence of an emergency situation for a worker; and
- a display control unit configured to perform control so as to display information about the emergency notification on a head-mounted display.

In a third example aspect, a program causes a computer to perform:
- a notification transmitting step of transmitting an emergency notification when a predetermined condition is satisfied, the emergency notification being a notification for reporting an occurrence of an emergency situation for a worker; and
- a display control step of performing control so as to display information about the emergency notification on a head-mounted display.

BRIEF DESCRIPTION OF DRAWINGS

The above and other aspects, features and advantages of the present disclosure will become more apparent from the following description of certain example embodiments when taken in conjunction with the accompanying drawings, in which.

EXAMPLE EMBODIMENT

Outline of Example Embodiment

Figure 1:
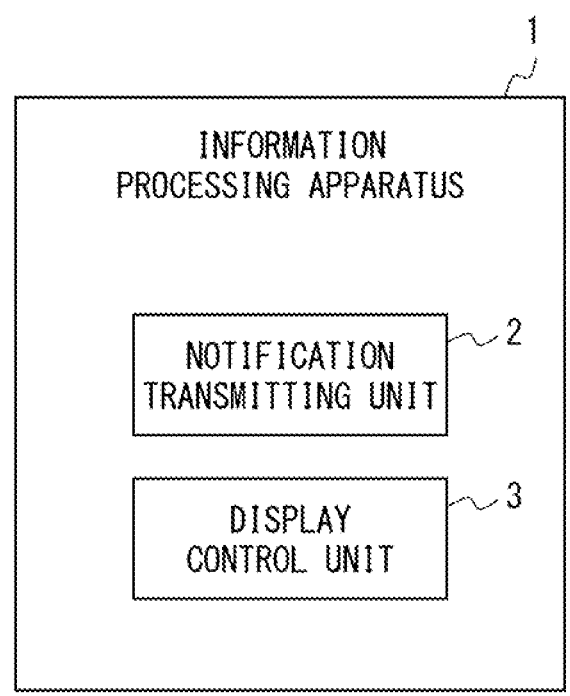
FIG. 1 is a block diagram showing an example of a configuration of an information processing apparatus according to an outline of an example embodiment.

Prior to describing an example embodiment in detail, an outline of the example embodiment will be described. FIG. 1 is a block diagram showing an example of a configuration of an information processing apparatus 1 according to the outline of an example embodiment. As shown in FIG. 1, the information processing apparatus 1 includes a notification transmitting unit 2 and a display control unit 3.

The notification transmitting unit 2 transmits an emergency notification, which is a notification for reporting the occurrence of an emergency situation for a worker(s), when a predetermined condition(s) is satisfied. The information processing apparatus 1 is, for example, an apparatus that is carried by a worker, and the notification transmitting unit 2 transmits, when the predetermined condition is satisfied, a notification (an emergency notification) for reporting the occurrence of an emergency situation for the worker carrying this information processing apparatus 1. The notification transmitting unit 2 transmits, for example, the emergency notification to a terminal operated by a director who directs the worker, but it may transmit the emergency notification to other information processing apparatuses carried by other workers (e.g., information processing apparatuses each of which has a configuration similar to that of the information processing apparatus 1). Further, the notification transmitting unit 2 may transmit the emergency notification to any given apparatus such as a server.

The display control unit 3 performs control so as to display information about the emergency notification on a head-mounted display. Specifically, the display control unit 3 performs control so as to display the emergency notification on a head-mounted display worn by (e.g., attached to) the worker carrying the information processing apparatus 1. Note that the head-mounted display is provided, for example, in a protector worn on (e.g., attached to) the head of the worker. Note that the protector worn on the head is, for example, a mask such as a protective mask, but it is not limited to the mask and may be a helmet or protective glasses.

Note that the information about the emergency notification that the display control unit 3 displays on the head-mounted display may be information for reporting the occurrence of an emergency situation for the worker carrying the information processing apparatus 1, or may be information for reporting the occurrence of an emergency situation for other workers carrying other information processing apparatuses. That is, the information displayed on the head-mounted display may be information about the emergency notification transmitted by the notification transmitting unit 2 of the information processing apparatus 1, or information about an emergency notification transmitted by other information processing apparatuses.

In accordance with the operation of the information processing apparatus 1, information about an emergency notification transmitted by the information processing apparatus 1 or other information processing apparatuses (e.g., an information processing apparatus having a configuration similar to that of the information processing apparatus 1) is displayed on the head-mounted display. In this way, the worker can visually recognize the information about the emergency notification. Incidentally, in the case where information is transmitted by sound, in some cases, the information cannot be recognized due to ambient sounds or noises occurring in the working environment or the like. Further, in the case where information is transmitted by vibrations, there is a risk that the information may not be perceived by a worker who is moving his/her body. In contrast to this, in the information processing apparatus 1, information is visually transmitted (i.e., conveyed) by using the head-mounted display as described above. Therefore, in accordance with the operation of the information processing apparatus 1, when an emergency situation for a worker occurs, the worker can correctly recognize the state of issuance of an emergency notification.

An example embodiment will be described hereinafter in detail.

First Example Embodiment

Figure 2:
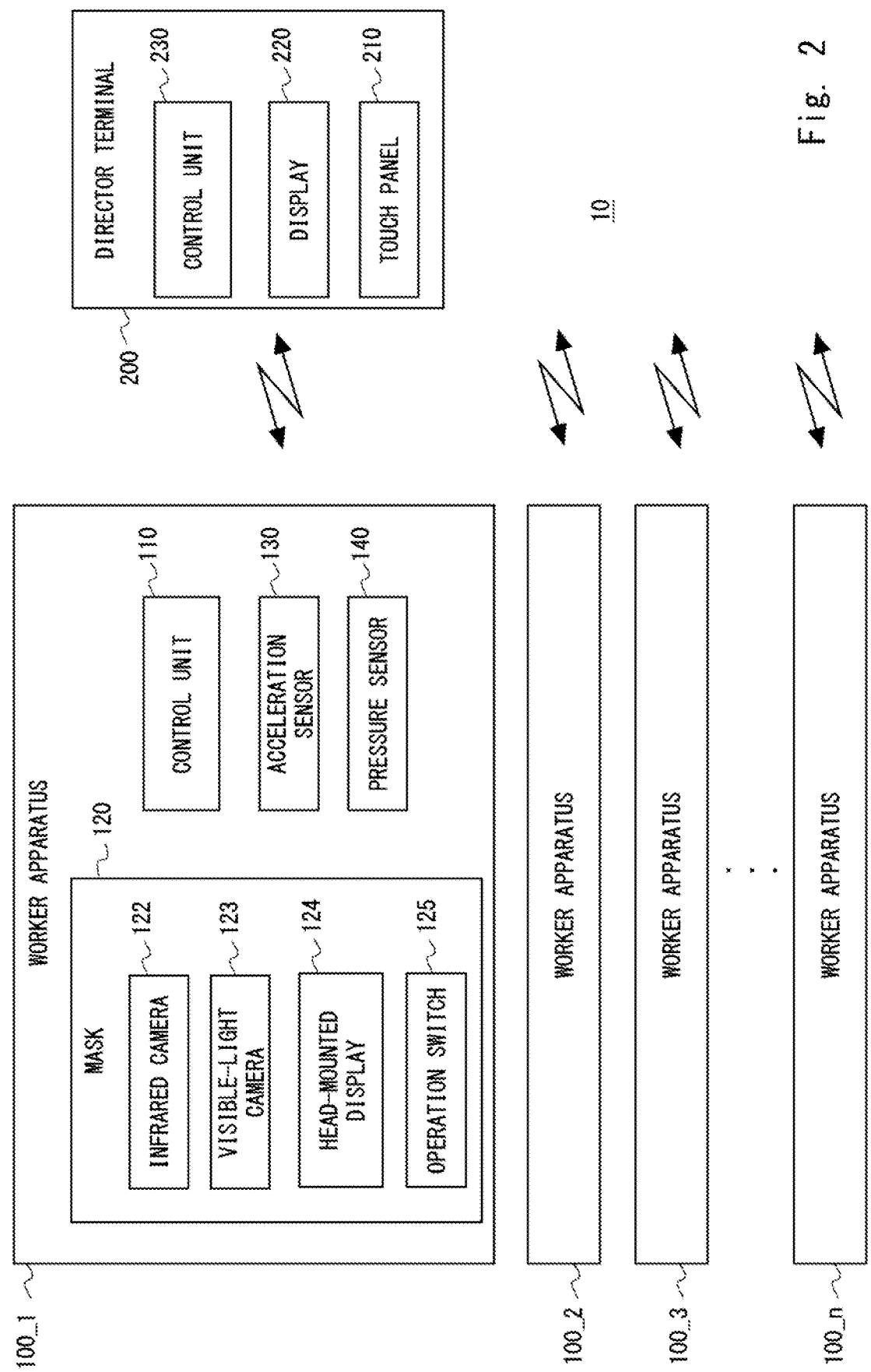
FIG. 2 is a block diagram showing an example of a configuration of a notification system according to an example embodiment.

FIG. 2 is a block diagram showing an example of a configuration of a notification system 10 according to a first example embodiment. As shown in FIG. 2, the notification system 10 includes worker apparatuses 100_1, 100_2, 100_3, . . . , and 100_n, and a director terminal 200. Note that the worker apparatuses 100_1, 100_2, 100_3, . . . , and 100_n have configurations similar to each other. Therefore, in the following description, when they are referred to without being distinguished from each other, they will be referred to simply as worker apparatuses 100. Note that there is no restriction on the number of worker apparatuses 100. In this example embodiment, since each of a plurality of worker apparatus 100 is carried by a respective one of a plurality of workers who perform certain work, the notification system 10 includes a plurality of worker apparatus 100. However, the notification system 10 may include only one worker apparatus 100. The worker apparatuses 100 and the director terminal 200 are wirelessly connected to each other so that they can communicate with each other. Further, the worker apparatuses 100 may also be wirelessly connected to each other so that they can communicate with each other.

Each of the worker apparatuses 100 includes a control unit 110, a mask 120, an acceleration sensor 130, and a pressure sensor 140. Each worker apparatus 100 is carried by a worker. For example, the worker may be, but is not limited to, a firefighter who engages in a firefighting activity.

For example, the worker may be a police officer, a member of the Self-Defense Forces, a member of a rescue team, a worker at a construction site, a worker in any given facility, or the like. That is, the worker apparatuses 100 can be carried by various workers. The control unit 110 and the acceleration sensor 130 are provided in an arbitrary place on the worker (e.g., in a control box attached to a gas cylinder carried on the worker's back). Further, the mask 120 is worn on (e.g., attached to) the head of the worker. The pressure sensor 140 is provided in the gas cylinder (e.g., an air cylinder) carried on the worker's back.

The acceleration sensor 130 detects an acceleration in order to detect the movement of the worker carrying the worker apparatus 100, and outputs the detection data (i.e., the detected acceleration) to the control unit 110.

The pressure sensor 140 detects a pressure in the gas cylinder in order to detect the remaining amount of the gas (e.g., air) contained in the gas cylinder, and outputs the detection data (i.e., the detected pressure) to the control unit 110.

The control unit 110 controls the operation performed by the worker apparatus 100. In particular, the control unit 110 controls the transmission and reception of emergency notifications, and displaying the information in the mask 120. The control unit 110 corresponds to the information processing apparatus 1 shown in FIG. 1. Details of the control unit 110 will be described later.

Figure 3:
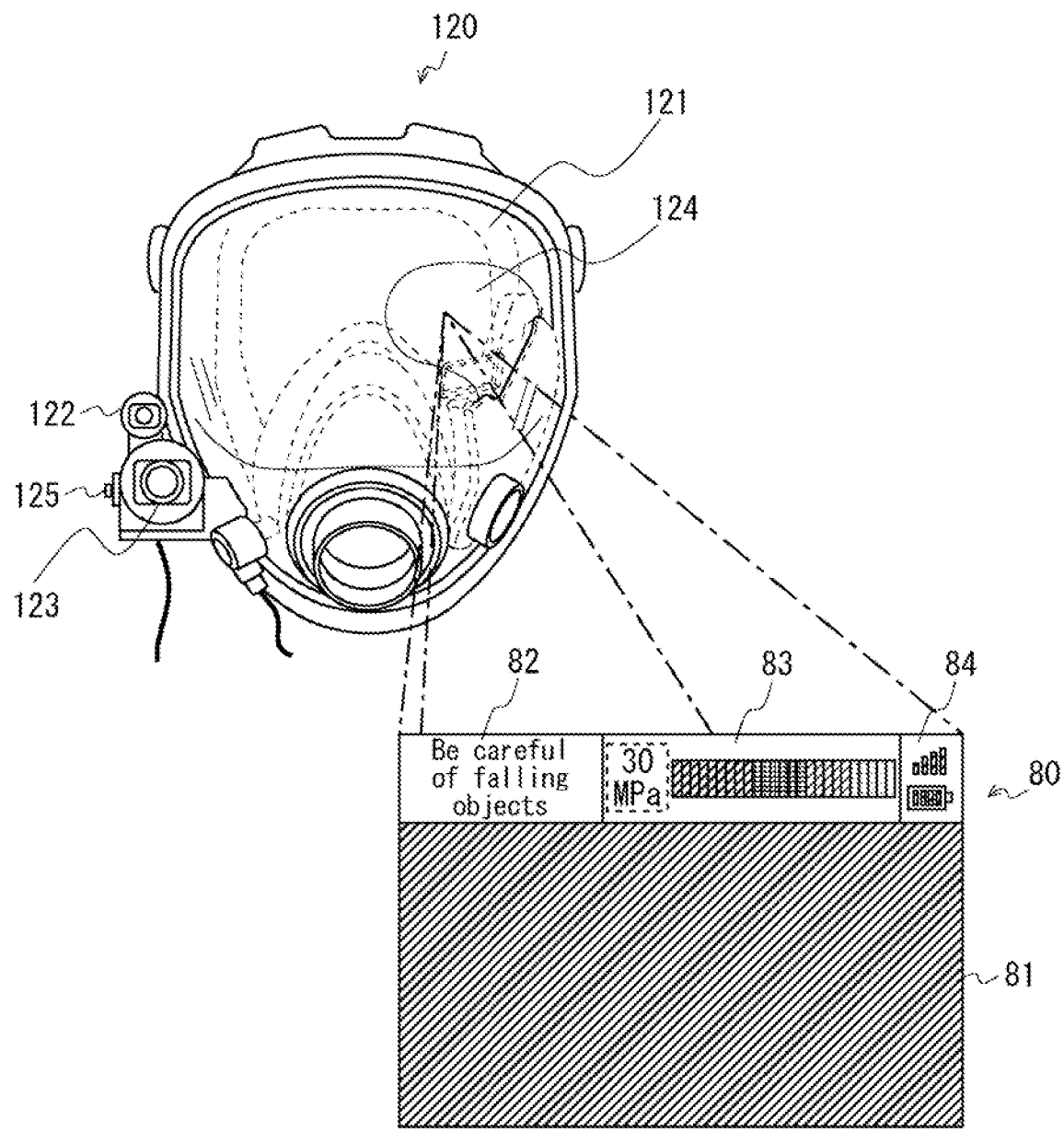
FIG. 3 shows a configuration of a mask.

FIG. 3 shows a configuration of the mask. The mask 120 includes a transparent cover (a face shield) 121. Further, as shown in FIG. 2, the mask 120 includes an infrared camera 122, a visible-light camera 123, a head-mounted display 124, and an operation switch 125. The infrared camera 122, the visible-light camera 123, the head-mounted display 124, and the operation switch 125 are arranged, for example, as shown in FIG. 3. Note that although the mask 120 includes both the infrared camera 122 and the visible-light camera 123 as image-pickup apparatuses (cameras) that photograph (e.g., film) the environment around the worker wearing the mask 120 in this example embodiment, the mask 120 may include only one of the infrared camera 122 and the visible-light camera 123.

The infrared camera 122 photographs (e.g., films) the environment around the worker based on infrared light received by the infrared camera 122. The infrared camera 122 outputs a video image taken by the infrared camera 122 (hereinafter referred to as an infrared camera video image) to the control unit 110.

The visible-light camera 123 photographs (e.g., films) the environment around the worker based on visible light received by the visible-light camera 123. The visible-light camera 123 outputs a video image taken by the visible-light camera 123 (hereinafter referred to as a visible-light camera video image) to the control unit 110.

The head-mounted display 124 displays arbitrary information so that the worker wearing the mask 120 can view the displayed information. The head-mounted display 124 displays a screen (e.g., an image of a window) according to the control performed by the control unit 110. Specifically, the head-mounted display 124 displays a screen (e.g., an image of a window) 80 as shown in FIG. 3. The head-mounted display 124 displays a virtual image (i.e., a false image) of the screen 80 in front of the worker wearing the mask 120. Note that, in the example shown in FIG. 3, the front surface of the mask 120 and the screen 80, which is a virtual image, face the same direction (i.e., the direction from the back of the paper toward the front thereof) for the sake of explanation. However, in an actual practice, the screen 80, which is a virtual image, is displayed so as to be opposed to the front surface of the mask 120.

Specifically, the head-mounted display 124 may include a reflective transparent member such as a combiner. Further, for example, a screen (i.e., an image of a window) generated by the control unit 110 of the worker apparatus 100 may be projected onto the combiner by using a well-known optical system. This projected screen is reflected (and enlarged) by the combiner and reaches the eyes of the worker wearing the mask 120. As a result, the worker wearing the mask 120 recognizes the screen as an enlarged virtual image floating in front of him/her (e.g., 1.5 m in front of him/her). In this way, since the image (the virtual image) overlaps the field of view of the worker wearing the mask 120, the worker can see the image (the virtual image) substantially without moving his/her line of sight. Note that since well-known optical systems can be used as the above-described optical system for projecting the virtual image, the description thereof is omitted. Note that the head-mounted display 124 may display a virtual image by projecting an image onto an arbitrary part of the transparent cover 121 of the mask 120.

The screen 80 shown in FIG. 3 includes, as an example, a taken-image display area 81, a message display area 82, a gas-cylinder display area 83, and an apparatus status display area 84. The taken-image display area 81 is an area where an image taken by the image-pickup apparatus of the mask 120 is displayed. For example, an infrared camera video image (i.e., a video image taken by the infrared camera) is displayed in the taken-image display area 81. The message display area 82 is an area where a message to the worker wearing the mask 120 is displayed. In this example embodiment, when a control unit 110 carried by a worker X transmits an emergency notification, a message for notifying this worker X that the emergency notification has been transmitted is displayed in the message display area 82. Note that a message that is created as the director operates the director terminal 200 (e.g., a message "Be careful of falling objects!") or the like may be displayed in the message display area 82. In the gas-cylinder display area 83, the remaining amount (the pressure) of the gas (e.g., air) contained in the gas cylinder is displayed. The apparatus status display area 84 is an area where the status of the apparatus such as the control unit 110 is displayed. For example, the remaining amount of a battery and the strength of radio waves used for communication are displayed in the apparatus status display area 84. Note that the screen 80 shown in FIG. 3 is merely an example, and may include areas where information other than the above-described information is displayed. For example, a map of the place where the worker works may be displayed. This map may be held in advance by the control unit 110, or may be transmitted from the director terminal 200 to the worker apparatus 100.

The operation switch 125 is operated by a member of the team. The operation switch 125 is, for example, a push-button switch. The operation switch 125 is operated by the worker carrying the worker apparatus 100 when an emergency situation occurs for this worker. For example, in this case, the worker holds down the operation switch 125. That is, the worker continues to press down the operation switch 125 for a predetermined time or longer. As a result, an emergency notification is transmitted as described later. Further, the operation switch 125 may be used to switch a display mode in the head-mounted display 124. For example, the display mode may be switched when the switch is pressed once for a time shorter than the predetermined time. Note that the types of operations that need to be performed on the operation switch 125 are not limited to the above-described examples. For example, an emergency notification may be transmitted when the operation switch 125 is pressed down for a time shorter than the predetermined time.

Figure 4:
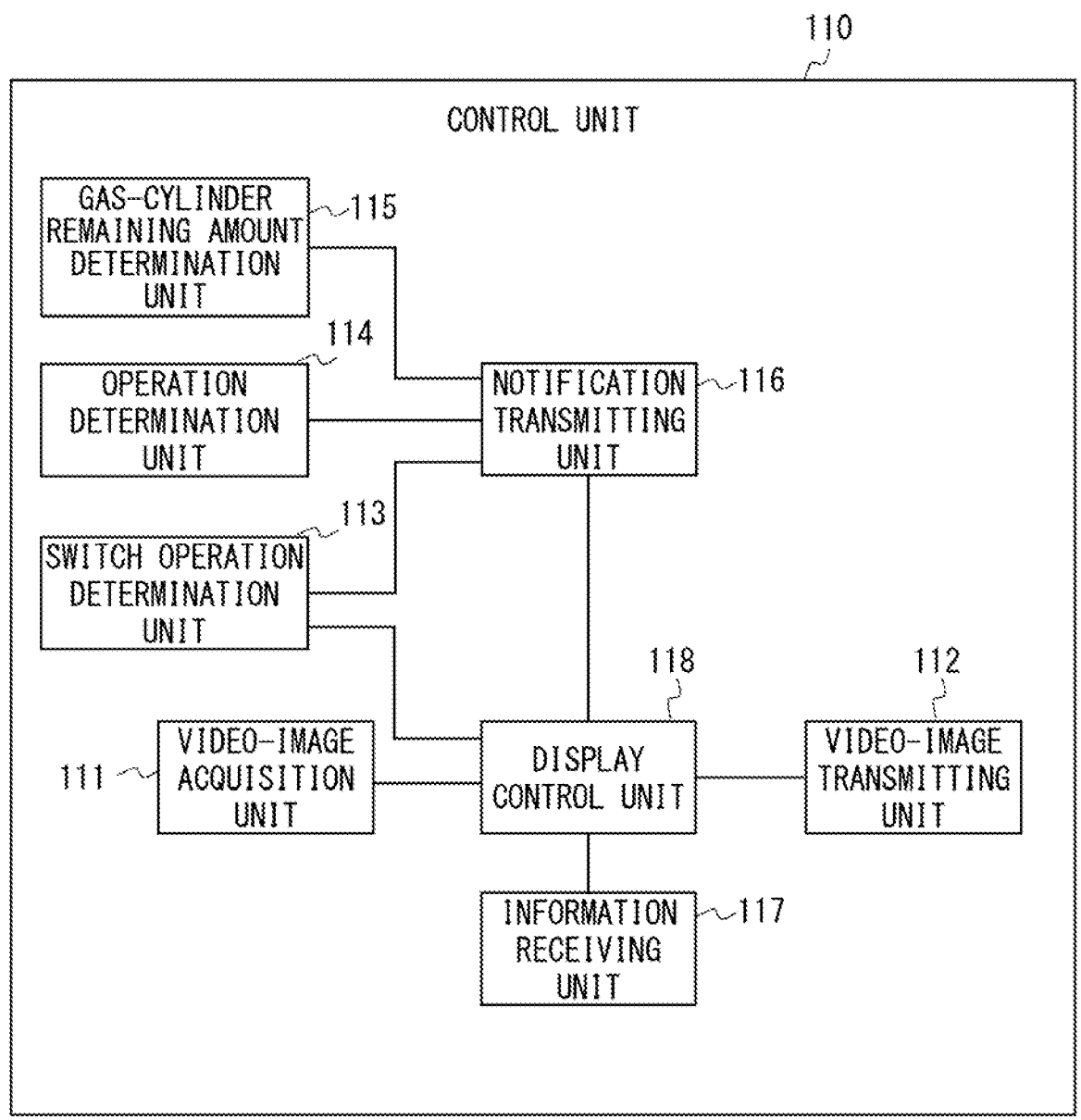
FIG. 4 is a block diagram showing an example of a functional configuration of a control apparatus of a worker apparatus.

Next, a configuration of the control unit 110 will be described. FIG. 4 is a block diagram showing an example of a functional configuration of the control unit 110. As shown in FIG. 4, the control unit 110 includes a video-image acquisition unit 111, a video-image transmitting unit 112, a switch operation determination unit 113, a movement determination unit 114, a gas-cylinder remaining amount determination unit 115, a notification transmitting unit 116, an information receiving unit 117, and a display control unit 118.

The video-image acquisition unit 111 acquires an infrared camera video image and a visible-light camera video image from the infrared camera 122 and the visible-light camera 123, respectively.

The video-image transmitting unit 112 transmits a video image of the screen 80 that is displayed on the head-mounted display 124 to the director terminal 200. Note that the video-image transmitting unit 112 may transmit the infrared camera video image and the visible-light camera video image. Further, the video-image transmitting unit 112 may transmit only one of the infrared camera video image and the visible-light camera video image according to an instruction from the director terminal 200.

The switch operation determination unit 113 determines whether or not a predetermined operation has been performed on the operation switch 125. In this example embodiment, the switch operation determination unit 113 determines whether or not a first predetermined operation has been performed on the operation switch 125, and whether or not a second predetermined operation has been performed on the operation switch 125. Note that the first predetermined operation is an operation that is performed when an emergency situation has occurred for the worker carrying the worker apparatus 100, and is specifically, for example, a long press of the operation switch 125. Meanwhile, the second predetermined operation is an operation for switching the display (i.e., the image) on the head-mounted display 124, and is specifically, for example, one short press of the operation switch 125.

The movement determination unit 114 determines whether or not the movement state of the worker carrying the worker apparatus 100 is a predetermined movement state. Note that the predetermined movement state is a movement (e.g., behavior) that is performed by the worker when an abnormality occurs for the worker, and is specifically, for example, a stillness state that continues for a predetermined time or longer. The movement determination unit 114 determines the movement state of the worker based on an output from a sensor that detects the motion of the worker. In this example embodiment, the movement determination unit 114 determines the movement state based on the output of the acceleration sensor 130.

The gas-cylinder remaining amount determination unit 115 determines whether or not the remaining amount of the gas (e.g., air) contained in the gas cylinder carried by the worker carrying the worker apparatus 100 has decreased beyond a predetermined threshold. Specifically, the gas-cylinder remaining amount determination unit 115 determines whether or not the remaining amount of the gas contained in the gas cylinder, which is determined (i.e., measured) based on the output of the pressure sensor 140, has decreased beyond the predetermined threshold.

The notification transmitting unit 116 corresponds to the notification transmitting unit 2 shown in FIG. 1. The notification transmitting unit 116 transmits an emergency notification to the director terminal 200 when a predetermined condition(s) is satisfied. In this example embodiment, the notification transmitting unit 116 transmits an emergency notification according to the results of the determinations of the switch operation determination unit 113, the movement determination unit 114, and the gas-cylinder remaining amount determination unit 115. That is, in this example embodiment, one of the above-described predetermined conditions is that the first predetermined operation is performed on the operation switch 125 provided in the protector (specifically, the mask 120) worn on (e.g., attached to) the head of the worker carrying the worker apparatus 100. Further, another one of the above-described predetermined conditions is that the movement state of the worker carrying the worker apparatus 100 is the predetermined movement state. Further, another one of the above-described predetermined conditions is that the remaining amount of the gas contained in the gas cylinder carried by the worker carrying the worker apparatus 100 has decreased beyond the predetermined threshold. The notification transmitting unit 116 transmits an emergency notification when one of these predetermined conditions is satisfied. Specifically, the notification transmitting unit 116 transmits information indicating the type of the emergency notification and information for identifying the source of the emergency notification (e.g., the worker apparatus 100 that has transmitted the emergency notification). Note that the information indicating the type of the emergency notification is information for specifying which of the predetermined conditions has been satisfied and thereby has triggered the transmission of the emergency notification. That is, the information indicating the type of the emergency notification is information indicating which of the determinations made by the switch operation determination unit 113, the movement determination unit 114, and the gas-cylinder remaining amount determination unit 115 has triggered the transmission of the emergency notification. Further, the information for identifying the source of the emergency notification is information for specifying for which worker the notification for reporting the occurrence of the emergency situation has been issued. For example, the information for identifying the source of the emergency notification may be the identification information of the worker or the identification information of the worker apparatus 100.

The information receiving unit 117 receives information transmitted from the director terminal 200. The information receiving unit 117 may also receive information transmitted from other worker apparatuses 100. In this example embodiment, the information receiving unit 117 receives a response signal from the director terminal 200 that has received an emergency notification transmitted by the notification transmitting unit 116. This response signal is transmitted from the director terminal 200 as the director, who has confirmed (i.e., recognized) that an emergency notification for a worker has been issued through the director terminal 200 (which will be described later), operates the director terminal 200. Further, in this example embodiment, the information receiving unit 117 receives, from the director terminal 200, an emergency notification transmitted from other worker apparatuses 100. This is because when the director terminal 200 receives an emergency notification from one of the worker apparatuses 100, it forwards the emergency notification to all of the other worker apparatuses 100 (which will be described later). As described above, in this example embodiment, the information receiving unit 117 receives an emergency notification for reporting the occurrence of an emergency situation for other workers carrying other worker apparatuses 100.

The display control unit 118 performs control so as to display the screen 80 (e.g., an image of a window) on the head-mounted display 124. For example, the display control unit 118 performs control so as to display a screen 80 including a video image (e.g., an infrared camera video image) acquired by the video-image acquisition unit 111 on the head-mounted display 124. Further, as described above, the display control unit 118 may acquire the remaining amount of the gas contained in the gas cylinder and/or the status of the apparatus, and perform control so as to display these information items.

The display control unit 118 corresponds to the display control unit 3 shown in FIG. 1. Therefore, the display control unit 118 further performs control so as to display information about an emergency notification in the head-mounted display 124. When the notification transmitting unit 116 has transmitted an emergency notification, the display control unit 118 performs control so as to display information about this emergency notification. Specifically, the display control unit 118 performs control so as to display information indicating that the notification transmitting unit 116 has transmitted an emergency notification on the head-mounted display 124. For example, in this case, the display control unit 118 performs control so as to display information indicating the type of the emergency notification transmitted by the notification transmitting unit 116 in the message display area 82.

Figure 5:
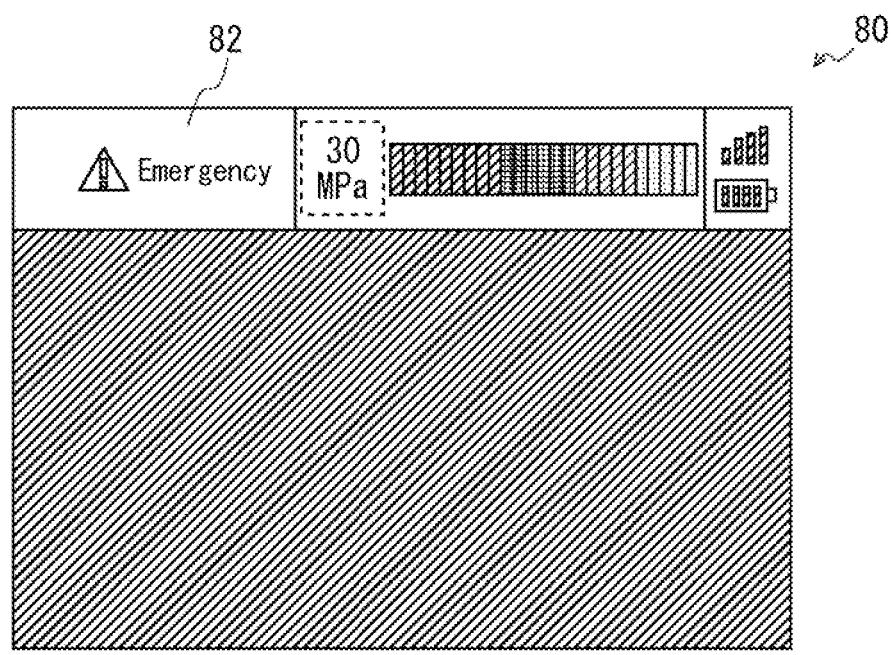
FIG. 5 shows an example of an image that is displayed on a head-mounted display when an operation switch is operated and an emergency notification is thereby transmitted.
Figure 6:
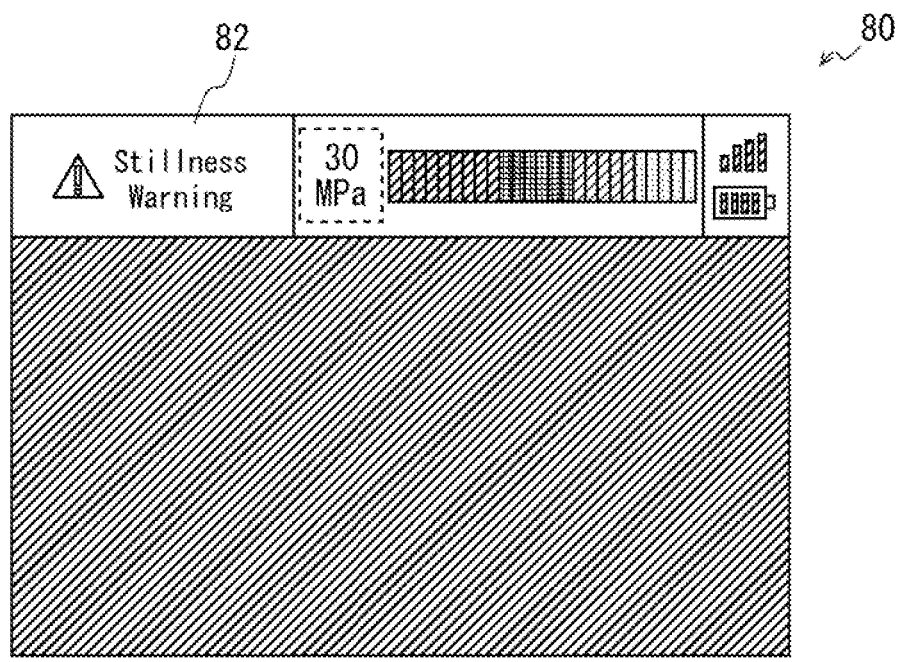
FIG. 6 shows an example of an image that is displayed on a head-mounted display when an emergency notification is transmitted because the movement of an operator is in a predetermined movement state.
Figure 7:
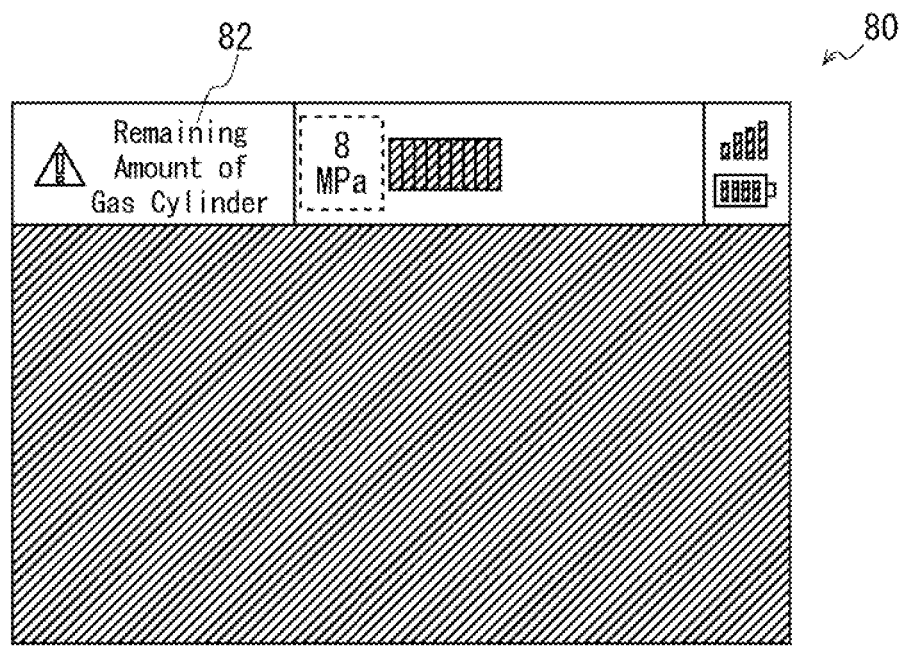
FIG. 7 shows an example of an image that is displayed on a head-mounted display when an emergency notification is transmitted because the remaining amount of gas in a gas cylinder has decreased beyond a threshold.

FIG. 5 shows an example of an image that is displayed on the head-mounted display 124 when the operation switch 125 is operated and an emergency notification is thereby transmitted. In this example, text "Emergency" is displayed as information indicating the type of the emergency notification in the message display area 82. Further, FIG. 6 shows an example of an image that is displayed on the head-mounted display 124 when an emergency notification is transmitted because the movement of the worker is in the predetermined movement state. In this example, text "Stillness Warning" is displayed as information indicating the type of the emergency notification in the message display area 82. Further, FIG. 7 shows an example of an image that is displayed on the head-mounted display 124 when an emergency notification is transmitted because the remaining amount of the gas contained in the gas cylinder has decreased beyond the threshold. In this example, text "Remaining Amount of Gas Cylinder" is displayed as information indicating the type of emergency notification in the message display area 82. Note that the display control unit 118 may display such information in an area other than the message display area 82.

As described above, when the notification transmitting unit 116 has transmitted an emergency notification, information about this emergency notification is displayed, so that the worker can visually recognize that the emergency notification has been transmitted from the worker apparatus 100 carried by him/her. Further, when the information receiving unit 117 receives a response signal from the destination of the emergency notification (i.e., from the director terminal 200), the display control unit 118 performs control so as to terminate the display of the information about the emergency notification transmitted by the notification transmitting unit 116. In this way, the worker can visually recognize that the emergency notification has been recognized by the director.

Further, when the information receiving unit 117 receives an emergency notification for reporting the occurrence of an emergency situation for other workers carrying other worker apparatuses 100, the display control unit 118 performs control so as to display information about this emergency notification. That is, the display control unit 118 performs control so as to display information indicating the emergency notification for reporting the occurrence of the emergency situation for the other worker carrying the other worker apparatus 100 on the head-mounted display 124. For example, in this case, the display control unit 118 displays information indicating the type of the received emergency notification and information for identifying the source of the emergency notification (e.g., the worker apparatus 100 that has transmitted the emergency notification) in the taken-image display area 81. When the display control unit 118 displays the information about the emergency notification in the taken-image display area 81, it performs control so as to display the information about the emergency notification on the infrared camera video image or the visible-light camera video image in a superimposed manner.

Figure 8:
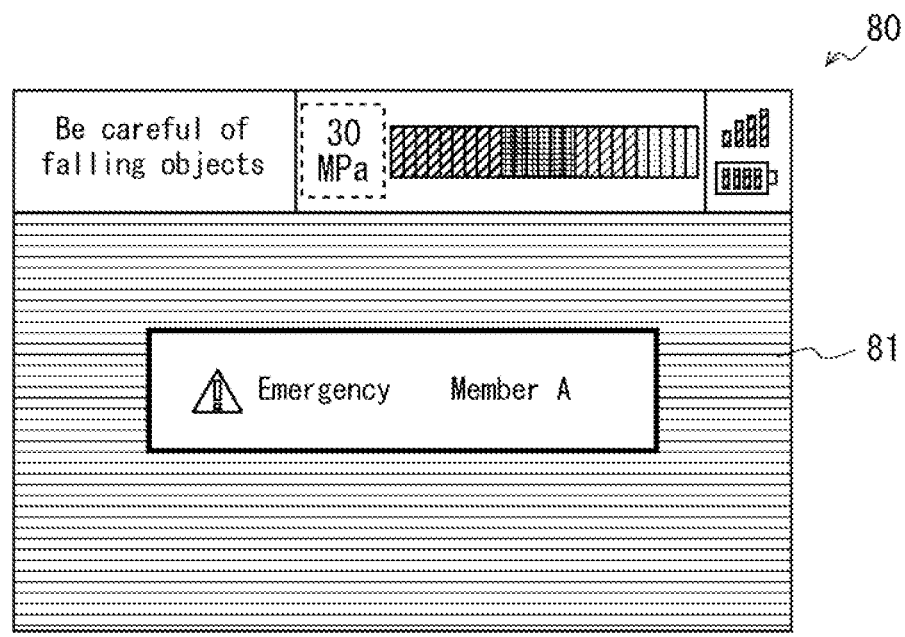
FIG. 8 shows an example of an image of an emergency notification, displayed on a head-mounted display, for reporting the occurrence of an emergency situation for another worker carrying another worker apparatus in a first example embodiment.
Figure 9:
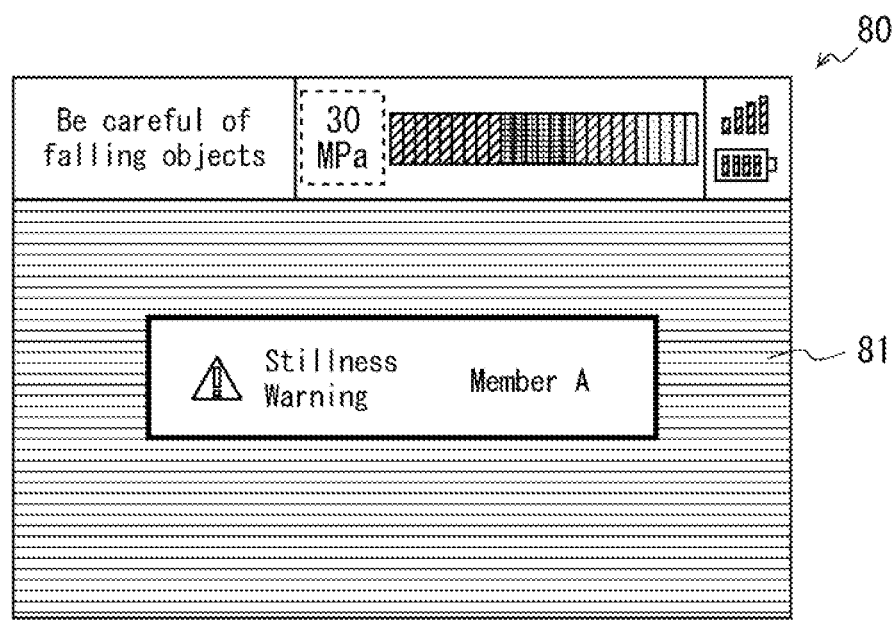
FIG. 9 shows an example of an image of an emergency notification, displayed on a head-mounted display, for reporting the occurrence of an emergency situation for another worker carrying another worker apparatus in the first example embodiment.
Figure 10:
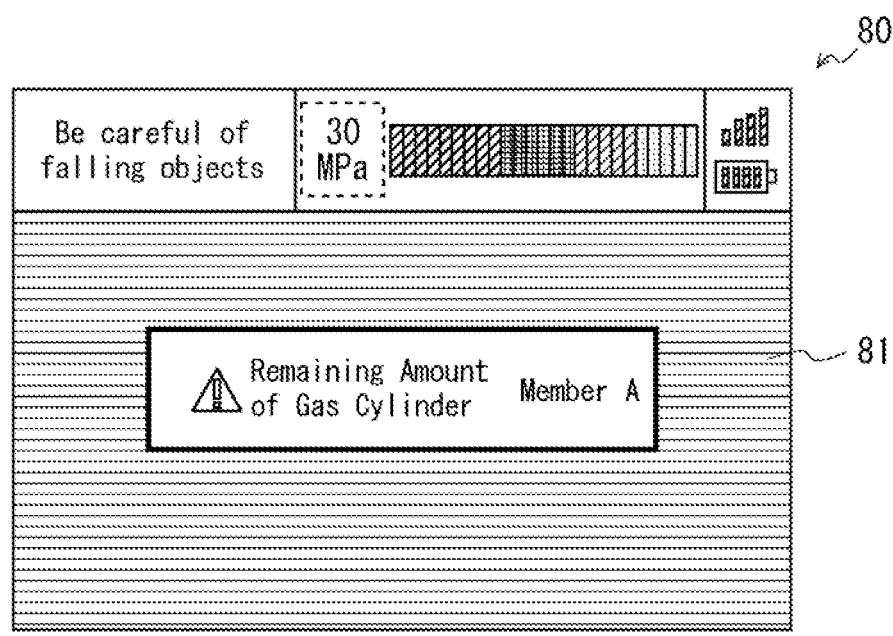
FIG. 10 shows an example of an image of an emergency notification, displayed on a head-mounted display, for reporting the occurrence of an emergency situation for another worker carrying another worker apparatus in the first example embodiment.

Each of FIGS. 8 to 10 shows an example of an image of an emergency notification, displayed on the head-mounted display 124, for reporting the occurrence of an emergency situation for another worker (a member A of the team) carrying another worker apparatus 100. Each of FIGS. 8 to 10 is an example of an image displayed on the head-mounted display 124 of a worker (a member) other than the member A. FIG. 8 shows an example of an image displayed on the head-mounted display 124 when the operation switch 125 is operated by the member A and an emergency notification is thereby transmitted. In this example, text "Emergency" as information indicating the type of emergency notification and text "Member A" as information for identifying the source of the emergency notification are displayed in the taken-image display area 81. Further, FIG. 9 shows an example of an image that is displayed on the head-mounted display 124 when an emergency notification is transmitted because the movement of the member A is in the predetermined movement state. In this example, text "Stillness Warning" as information indicating the type of emergency notification and text "Member A" as information for identifying the source of the emergency notification are displayed in the taken-image display area 81. FIG. 10 shows an example of an image that is displayed on the head-mounted display 124 when an emergency notification is transmitted because the remaining amount of the gas contained in the gas cylinder of the member A has decreased beyond the threshold. In this example, text "Remaining Amount of Gas Cylinder" as information indicating the type of emergency notification and text "Member A" as information for identifying the source of the emergency notification are displayed in the taken-image display area 81. Note that the display control unit 118 may display the information about the received emergency notification in an area other than the taken-image display area 81.

By performing such display control, the worker carrying the worker apparatus 100 can visually recognize that an emergency situation has occurred for other workers. Therefore, the worker can quickly go to the place of the worker for whom the emergency situation has occurred in order to check the situation and/or rescue the worker. Further, when a predetermined operation for switching the display is performed on the operation switch 125, the display control unit 118 performs control so as to terminate the display of the information about the emergency notification received by the information receiving unit 117. That is, when the second predetermined operation for the operation switch 125 is detected by the switch operation determination unit 113, the display control unit 118 performs control so as to terminate the display of the information about the emergency notification received by the information receiving unit 117. In this way, the worker can terminate the display of the information about the emergency notification at his/her will. In particular, even when the information about the emergency notification is displayed on the camera video image in a superimposed manner, the worker can preferentially see the displayed camera video image.

Next, the director terminal 200 will be described. The director terminal 200 is a terminal operated by a director who directs workers. As shown in FIG. 2, the director terminal 200 includes a touch panel 210, a display 220, and a control unit 230. The touch panel 210 is an input device operated by the director, and is disposed in a state in which the touch panel 210 covers the display surface of the display 220. The display 220 is, for example, a display equipped with a touch panel 210. A display equipped with a touch panel is also called a touch screen display.

Figure 11:
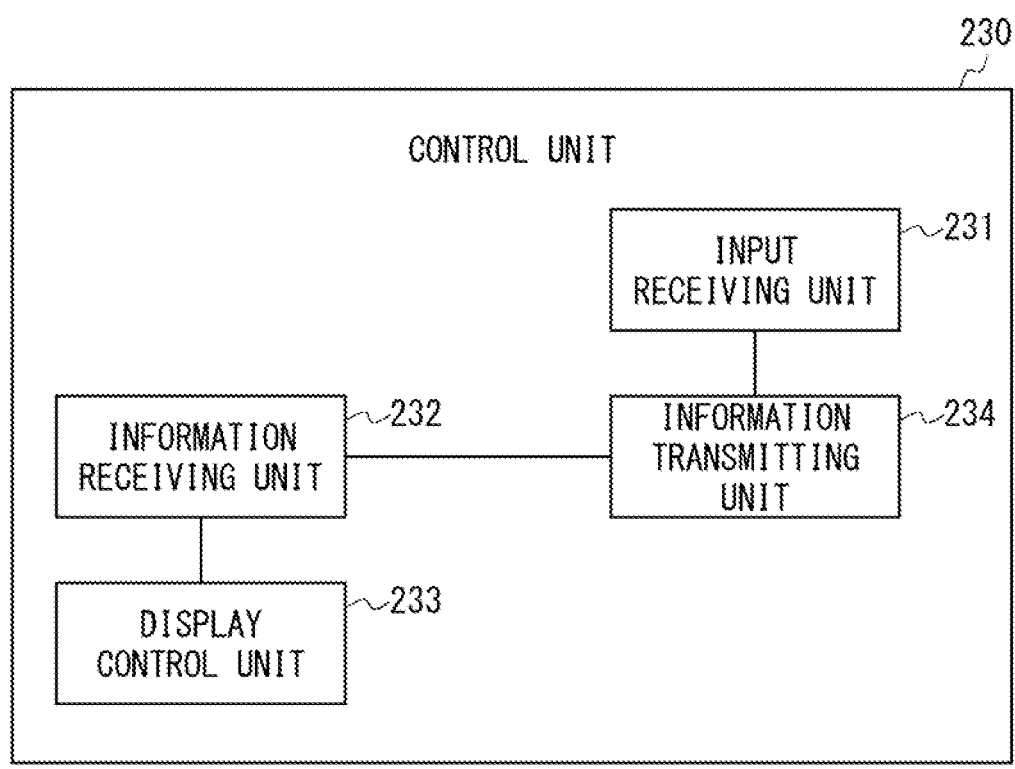
FIG. 11 is a block diagram showing an example of a functional configuration of a control apparatus of a director terminal.

FIG. 11 is a block diagram showing an example of a functional configuration of the control unit 230 of the director terminal 200. As shown in FIG. 11, the control unit 230 includes an input receiving unit 231, an information receiving unit 232, a display control unit 233, and an information transmitting unit 234.

The input receiving unit 231 receives an input through the touch panel 210. Therefore, it can be said that the input receiving unit 231 receives an instruction from the director.

The information receiving unit 232 receives information transmitted from the worker apparatus 100. In particular, in this example embodiment, the information receiving unit 232 receives an emergency notification transmitted from the worker apparatus 100.

Figure 12:
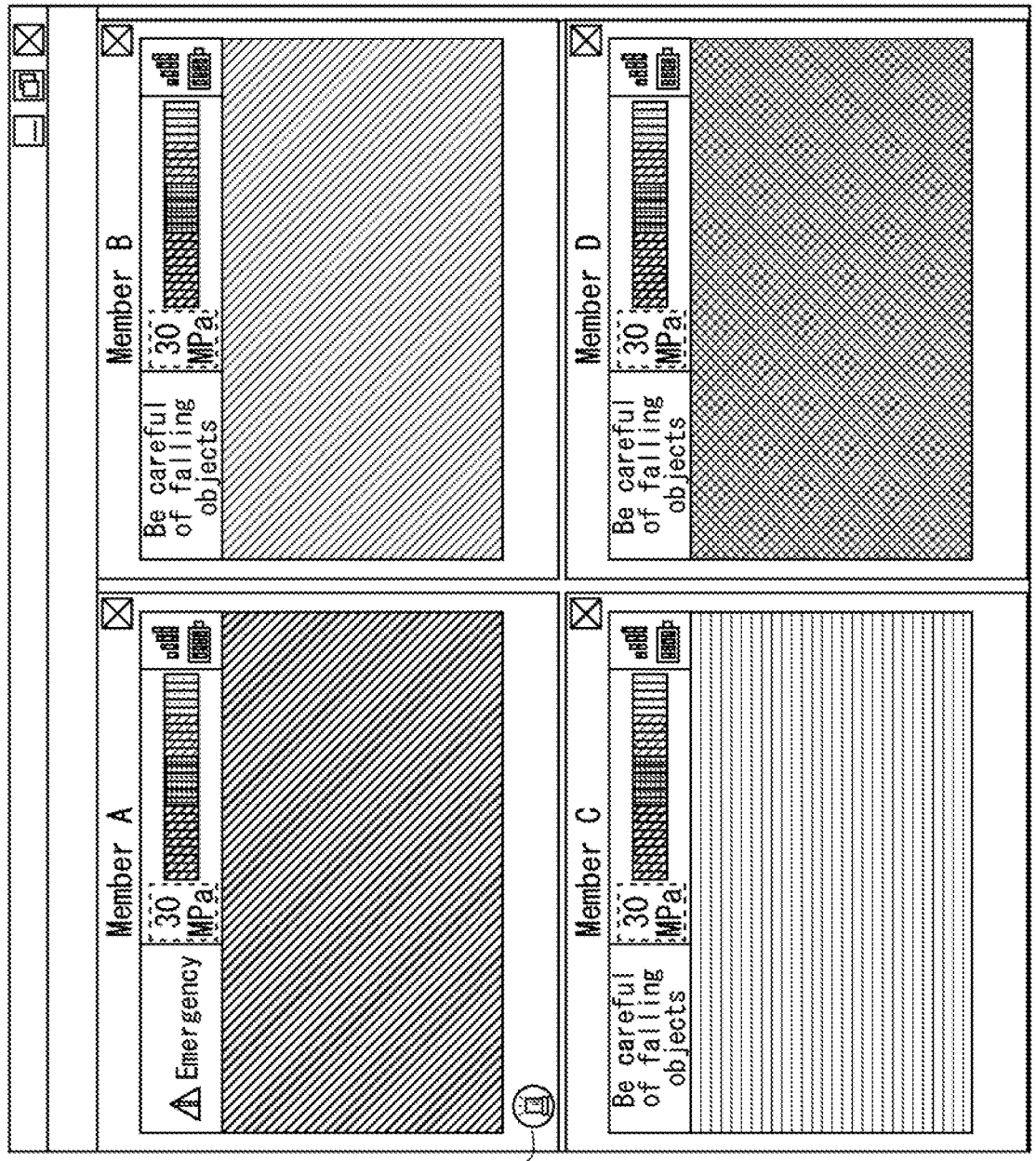
FIG. 12 is a schematic diagram showing an example of a screen (i.e., a window) displayed under the control of a display control unit of a director terminal.

The display control unit 233 performs control so as to display a screen (i.e., an image of a window) 90 on the display 220. FIG. 12 is a schematic diagram showing an example of the screen 90 displayed under the control of the display control unit 233. As shown in FIG. 12, on the screen 90, for example, video images displayed on the head-mounted displays 124 of workers (e.g., members A, B, C and D) are arranged in an orderly manner. Therefore, the director can check the state of each of the workers. Further, when the information receiving unit 232 receives an emergency notification from the worker apparatus 100, the display control unit 233 performs control so as to display the received emergency notification on the display 220. Specifically, the display control unit 233 performs control so as to display an icon 91, which indicates that an emergency notification has been received, on the display 220. In the example shown in FIG. 12, an example of the screen 90 in the case where an emergency notification from the worker apparatus 100 of the member A has been received is shown, and an icon 91, which indicates that the emergency notification for the member A has been received, is displayed. Note that when the director has recognized the emergency notification for the member A, he/she touches the icon 91 on the touch panel 210. When the icon 91 is touched, the information transmitting unit 234 transmits a response signal to the worker apparatus 100 of the member A. As a result, the display of the emergency notification disappears on the head-mounted display 124 of the worker apparatus 100 of the member A as described above. Note that, in addition to or instead of the icon 91, the display control unit 233 may perform control so as to display information indicating the type of the emergency notification and/or information for identifying the source of the emergency notification.

The information transmitting unit 234 transmits information to the worker apparatus 100. In this example embodiment, in particular, the information transmitting unit 234 transmits the above-described response signal to the worker apparatus 100 from which the emergency notification has been transmitted. Further, the information transmitting unit 234 forwards the emergency notification received by the information receiving unit 232 to worker apparatuses 100 other than the worker apparatus 100 from which the emergency notification has been transmitted. In this example embodiment, the information transmitting unit 234 forwards the emergency notification to all the worker apparatuses 100 other than the worker apparatus 100 from which the emergency notification has been transmitted. Note that the information transmitting unit 234, which performs the above-described process and the like, may be referred to as a forwarding unit. Further, the information transmitting unit 234 may transmit information (e.g., a message from the director to a worker(s)) according to an input received by the input receiving unit 231.

Figure 13:
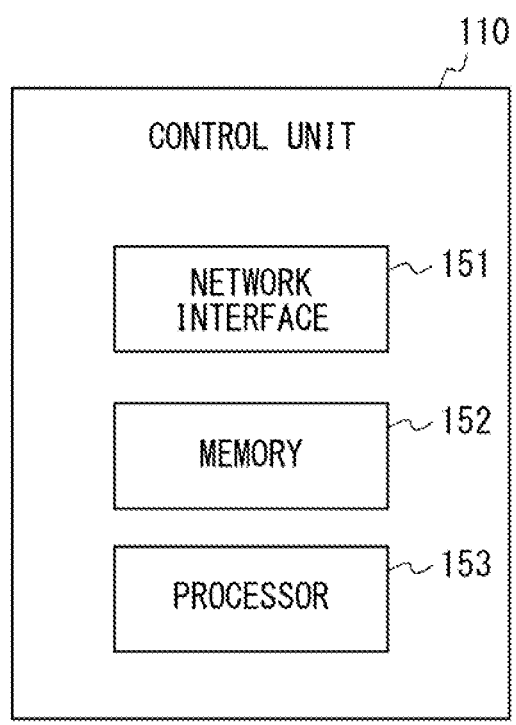
FIG. 13 is a schematic diagram showing an example of a hardware configuration of a control apparatus of a worker apparatus.

Next, a hardware configuration of the control unit 110 of the worker apparatus 100 will be described. FIG. 13 is a schematic diagram showing an example of the hardware configuration of the control unit 110. As shown in FIG. 13, the control unit 110 includes a network interface 151, a memory 152, and a processor 153.

The network interface 151 is used to communicate with other arbitrary apparatus such as the director terminal 200 and other worker apparatuses 100. The network interface 151 may include, for example, a network interface card (NIC).

The memory 152 is composed of, for example, a combination of a volatile memory and a non-volatile memory. The memory 152 is used to store a program(s) executed by the processor 153, and data used for various processes performed by the worker apparatus 100.

The processor 153 performs the process performed by each of the components shown in FIG. 4 by loading the program(s) from the memory 152 and executing the loaded program(s). The processor 153 may be, for example, a microprocessor, an MPU (Micro Processor Unit), or a CPU (Central Processing Unit). The processor 153 may include a plurality of processors.

As described above, the worker apparatus 100 has functions as a computer. Note that although it is not shown in the drawings, the control unit 230 of the director terminal 200 also has a configuration similar to that shown in FIG. 13. That is, the director terminal 200 also includes a processor and a memory, and has functions as a computer. Therefore, the process performed by each of the components of the control unit 230 of the director terminal 200 shown in FIG. 11 is carried out by having the processor executes the program(s).

The program includes a set of instructions (or software code) that, when being loaded into a computer, causes the computer to perform one or more of the functions described in the example embodiment. The program may be stored in a non-transitory computer readable medium or in a tangible storage medium. By way of example rather than limitation, the computer readable medium or the tangible storage medium may include random-access memories (RAMs), read-only memories (ROMs), flash memories, solid-state drives (SSDs) or other memory technologies, CD-ROMs, digital versatile discs (DVDs), Blu-Ray (Registered Trademark) discs or other optical disc storages, magnetic cassettes, magnetic tape, and magnetic disc storages or other magnetic storage devices. The program may be transmitted on a transitory computer readable medium or a communication medium. By way of example rather than limitation, the transitory computer readable medium or the communication medium may include electrical, optical, acoustic, or other forms of propagation signals.

Figure 14:
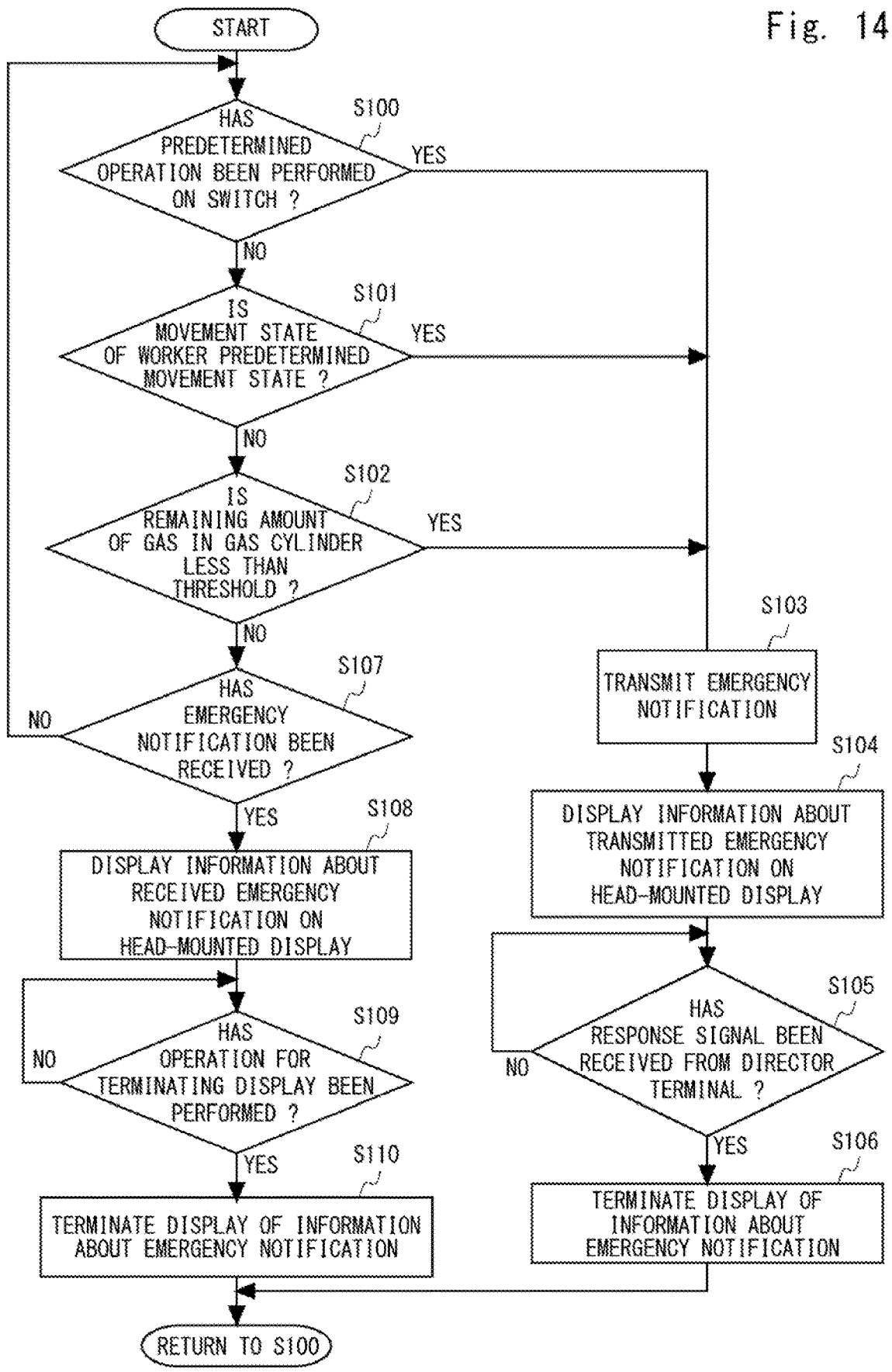
FIG. 14 is a flowchart showing an example of a flow of operations performed by a worker apparatus.

Next, operations for transmitting and displaying an emergency notification, performed by the worker apparatus 100 will be described. FIG. 14 is a flowchart showing an example of a flow of operations performed by the worker apparatus 100. An example of operations performed by the worker apparatus 100 will be described hereinafter with reference to FIG. 14. Note that the order of processes in respective steps in the flowchart shown in FIG. 14 and the like can be changed as appropriate, as long as they are not technically inconsistent.

In a step S100, the switch operation determination unit 113 determines whether or not a predetermined operation, i.e., an operation that is performed when an emergency situation occurs for the worker carrying the worker apparatus 100, has been performed on the operation switch 125. When such an operation has not been performed, the process moves to a step S101. On the other hand, when such an operation has been performed, the process moves to a step S103.

In a step S101, the movement determination unit 114 determines whether or not the movement state of the worker carrying the worker apparatus 100 is the predetermined movement state. That is, the movement determination unit 114 determines whether or not the movement state of the worker is the stillness state. When the movement state of the worker is not the predetermined movement state, the process moves to a step S102. On the other hand, when the movement state of the worker is the predetermined movement state, the process moves to the step S103.

In the step S102, the gas-cylinder remaining amount determination unit 115 determines whether or not the remaining amount of the gas (e.g., air) in the gas cylinder carried by the worker carrying the worker apparatus 100 has decreased beyond the predetermined threshold. When the remaining amount is larger than or equal to the predetermined threshold, the process moves to a step S107. On the other hand, when the remaining amount is less than the predetermined threshold, the process moves to the step S103.

In the step S103, the notification transmitting unit 116 transmits an emergency notification for reporting the occurrence of an emergency situation for the worker carrying the worker apparatus 100 to the director terminal 200. After the step S103, the process moves to a step S104.

In the step S104, the display control unit 118 performs control so as to display information about the emergency notification transmitted in the step S103 on the head-mounted display 124. As a result, information like the one shown in FIG. 5, 6 or 7 is displayed on the head-mounted display 124. After the step S104, the process moves to a step S105.

In the step S105, the display control unit 118 determines whether or not the information receiving unit 117 has received a response signal from the director terminal 200. This step is repeated until the response signal from the director terminal 200 is received. Then, when the response signal from the director terminal 200 is received, i.e., when the director has recognized the emergency notification transmitted in the step S103, the process moves to a step S106.

In the step S106, the display control unit 118 performs control so as to terminate the display of the information about the emergency notification displayed in the step S104. Then, the process returns to the step S100.

Meanwhile, in the step S107, the display control unit 118 determines whether or not the information receiving unit 117 has received an emergency notification from other worker apparatuses 100. When an emergency notification from the other worker apparatuses 100 has been received, the process moves to a step S108, whereas when no emergency notification has been received from the other worker apparatuses 100, the process returns to the step S100.

In the step S108, the display control unit 118 performs control so as to display information about the emergency notification received in the step S107 on the head-mounted display 124. As a result, information like the one shown in FIG. 8, 9 or 10 is displayed on the head-mounted display 124. After the step S108, the process moves to a step S109.

In a step S109, the switch operation determination unit 113 determines whether or not an operation for switching the display (i.e., the image) on the head-mounted display 124 has been performed on the operation switch 125. This step is repeated until such an operation is performed, and when such an operation is performed, the process moves to a step S110.

In the step S110, the display control unit 118 performs control so as to terminate the display of the information about the emergency notification displayed in the step S108. Then, the process returns to the step S100.

The first example embodiment has been described above. According to the first example embodiment, as described above, information is visually transmitted (i.e., conveyed) by using the head-mounted display 124. Therefore, when an emergency situation for a worker occurs, the worker can accurately recognize the state of issuance of an emergency notification. Note that although the notification transmitting unit 116 transmits the emergency notification to the director terminal 200 in the above description, the notification transmitting unit 116 may also transmit the emergency notification to other worker apparatuses 100. That is, the emergency notification transmitted from the worker apparatus 100 may be directly transmitted to other worker apparatuses 100. In such a case, the process for forwarding the emergency notification performed by the director terminal 200 may be omitted. Further, although the emergency notification is also sent to other worker apparatuses 100 in the above description, the emergency notification may be sent only to the director terminal 200. That is, the director terminal 200 does not necessarily have to forward the emergency notification to any of the worker apparatuses 100 other than the worker apparatus 100 from which the emergency notification has been transmitted.

Second Example Embodiment

Next, a second example embodiment will be described. This example embodiment differs from the first example embodiment in that the display control unit 118 performs the below-shown control when the worker apparatus 100 receives an emergency notification for reporting the occurrence of an emergency situation for other workers carrying other worker apparatuses 100. That is, in this example embodiment, when the worker apparatus 100 receives an emergency notification for reporting the occurrence of an emergency situation for another worker carrying another worker apparatus 100, the display control unit 118 performs control so as to display, on the head-mounted display 124, a video image taken by a camera carried by the other worker. That is, the display control unit 118 performs control so as to display, on the head-mounted display 124, an infrared camera video image or a visible-light camera video image of the worker for whom the emergency situation has occurred. Note that, in this case, the display control unit 118 may also perform control so as to display information indicating the type of the received emergency notification and information for identifying the source of the emergency notification (e.g., the worker apparatus 100 that has transmitted the emergency notification) as being performed in the first example embodiment.

In this example embodiment, in order to enable the above-described displaying operation, when the information transmitting unit 234 of the director terminal 200 forwards the emergency notification to each of the worker apparatuses 100, the information transmitting unit 234 also transmits an infrared camera video image or a visible-light camera video image acquired from the source of the emergency notification (e.g., the worker apparatus 100 that has transmitted the emergency notification) to each of the worker apparatuses 100. Note that in the case where the emergency notification transmitted from the worker apparatus 100 is directly transmitted to other worker apparatuses 100, the infrared camera video image or the visible-light camera video image may also be directly transmitted from the worker apparatus 100 from which the emergency notification has been transmitted to the other worker apparatuses 100.

Figure 15:
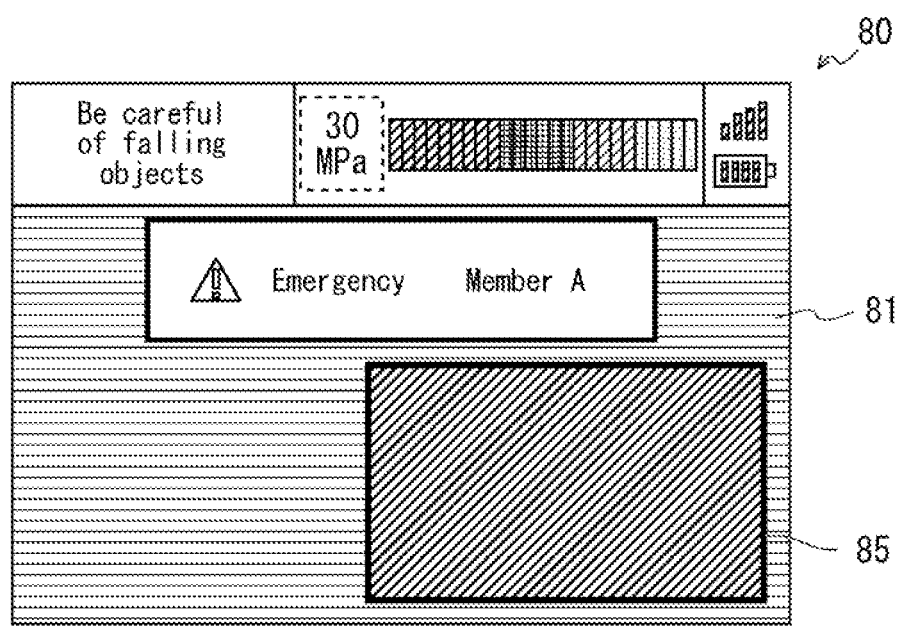
FIG. 15 shows an example of an image of an emergency notification, displayed on a head-mounted display, for reporting the occurrence of an emergency situation for another worker carrying another worker apparatus in a second example embodiment.
Figure 16:
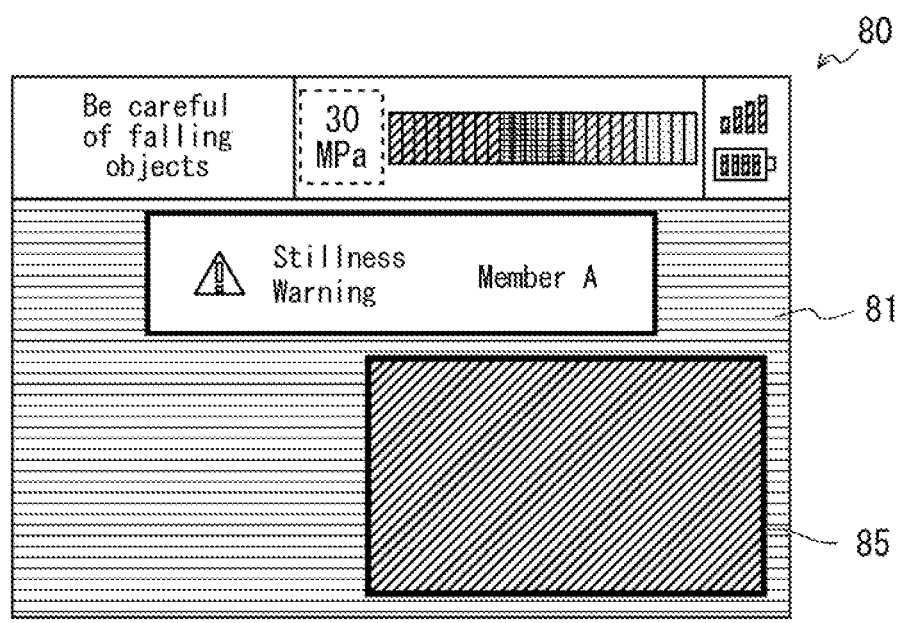
FIG. 16 shows an example of an image of an emergency notification, displayed on a head-mounted display, for reporting the occurrence of an emergency situation for another worker carrying another worker apparatus in the second example embodiment.
Figure 17:
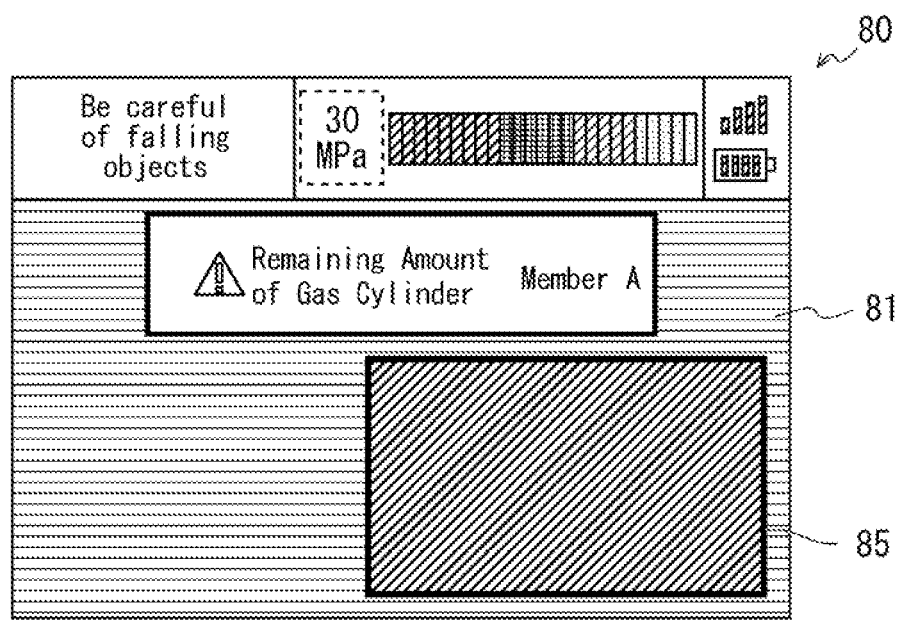
FIG. 17 shows an example of an image of an emergency notification, displayed on a head-mounted display, for reporting the occurrence of an emergency situation for another worker carrying another worker apparatus in the second example embodiment.

Each of FIGS. 15 to 17 shows an example of an image of an emergency notification, displayed on the head-mounted display 124, for reporting the occurrence of an emergency situation for another worker (a member A of the team) carrying another worker apparatus 100 in the second example embodiment. Each of FIGS. 15 to 17 is an example of an image displayed on the head-mounted display 124 of a worker (a member) other than the member A. FIG. 15 shows an example of an image displayed on the head-mounted display 124 when the operation switch 125 is operated by the member A and an emergency notification is thereby transmitted. Further, FIG. 16 shows an example of an image that is displayed on the head-mounted display 124 when an emergency notification is transmitted because the movement of the member A is in the predetermined movement state. FIG. 17 shows an example of an image that is displayed on the head-mounted display 124 when an emergency notification is transmitted because the remaining amount of the gas contained in the gas cylinder of the member A has decreased beyond the threshold. As shown in FIGS. 15 to 17, the display control unit 118 according to this example embodiment displays, for example, a camera video image 85 of the member A in the taken-image display area 81. Note that, in the examples shown in FIGS. 15 to 17, the display control unit 118 performs control so as to display the camera video image 85 of the member A on the infrared camera video image or the visible-light camera video image of the worker who has received the emergency notification of the other worker on a superimposed manner. Note that the display control unit 118 may display the camera video image 85 of the member A in an area other than the taken-image display area 81.

By performing such display control, the worker carrying the worker apparatus 100 can check, when an emergency situation occurs for another worker, a video image taken by the camera of the worker for whom the emergency situation has occurred. Therefore, the worker, who has seen the video image, can check (e.g., recognize) the place of the worker for whom the emergency situation has occurred and what kind of situation this worker is in (e.g., whether he lies down or is active). Therefore, it can be expected that the time it takes to rescue the worker for whom the emergency situation has occurred will be shortened.

Note that, in this example embodiment, when a predetermined operation for switching the display (i.e., the image) is performed on the operation switch 125, the display control unit 118 also performs control so as to terminate the display of the information about the emergency notification received by the information receiving unit 117. That is, when the second predetermined operation for the operation switch 125 is detected by the switch operation determination unit 113, the display control unit 118 performs control so as to terminate the display of the information about the emergency notification received by the information receiving unit 117. Note that, in this case, the display control unit 118 may terminate only the display of the camera video image, only the display of the text information, or both of the camera video image and the text information.

Third Example Embodiment

Next, a third example embodiment will be described. This example embodiment differs from the first example embodiment in that an emergency notification is transmitted, among the worker apparatuses 100 other than the worker apparatus 100 that has transmitted this emergency notification, only to a worker apparatus(es) 100 located near the worker apparatus 100 that has transmitted the emergency notification. In the following description, descriptions of configurations and processes similar to those in the first example embodiment will be omitted as appropriate, and differences from the first example embodiment will be described in detail.

The configuration according to the third example embodiment differs from that of the first example embodiment in that the control unit 110 of the worker apparatus 100 is replaced by a control apparatus 110*a* and the control unit 230 of the director terminal 200 is replaced by a control unit 230*a*.

Figure 18:
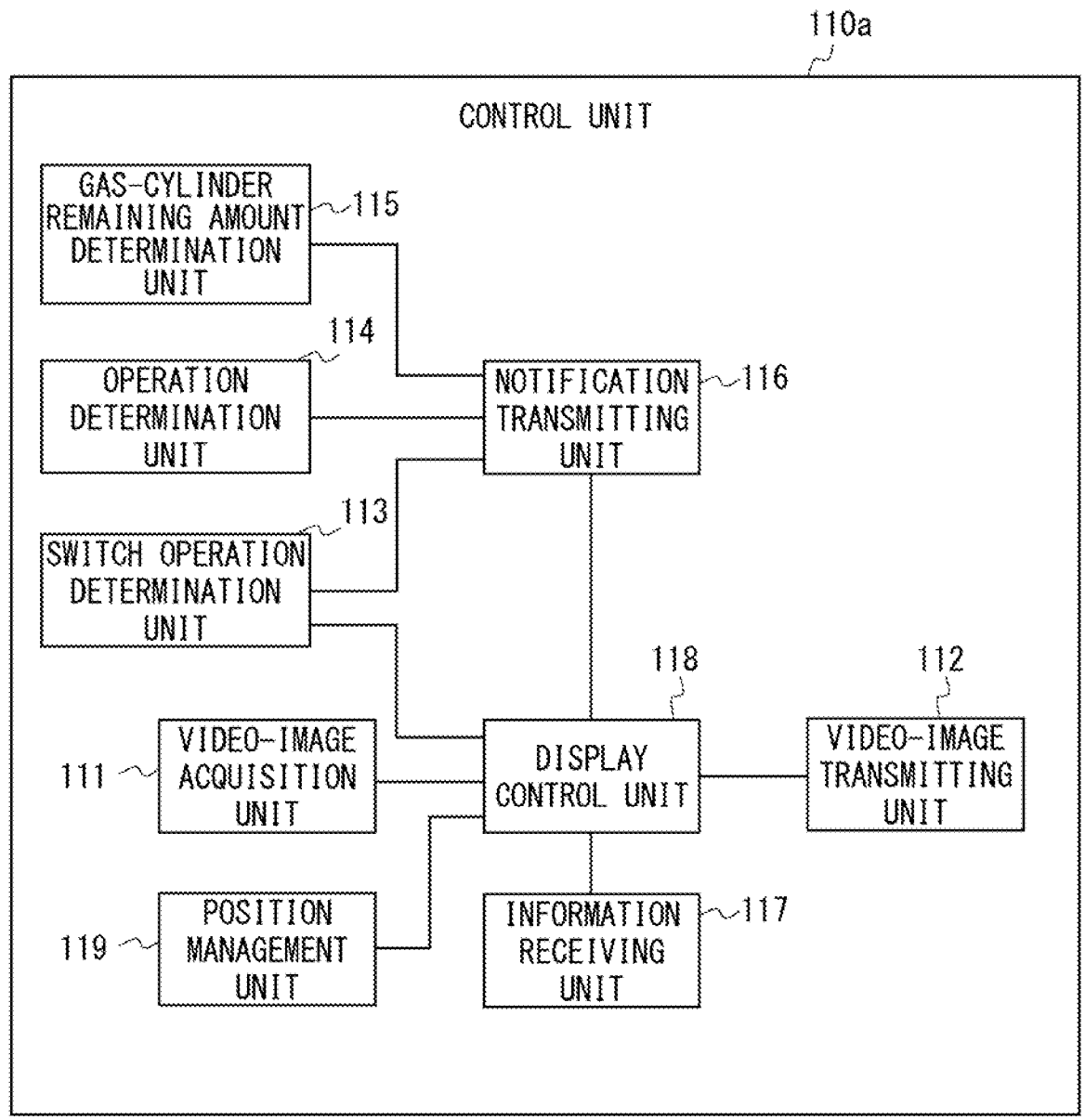
FIG. 18 is a block diagram showing an example of a functional configuration of a control apparatus of a worker apparatus according to a third example embodiment.
Figure 19:
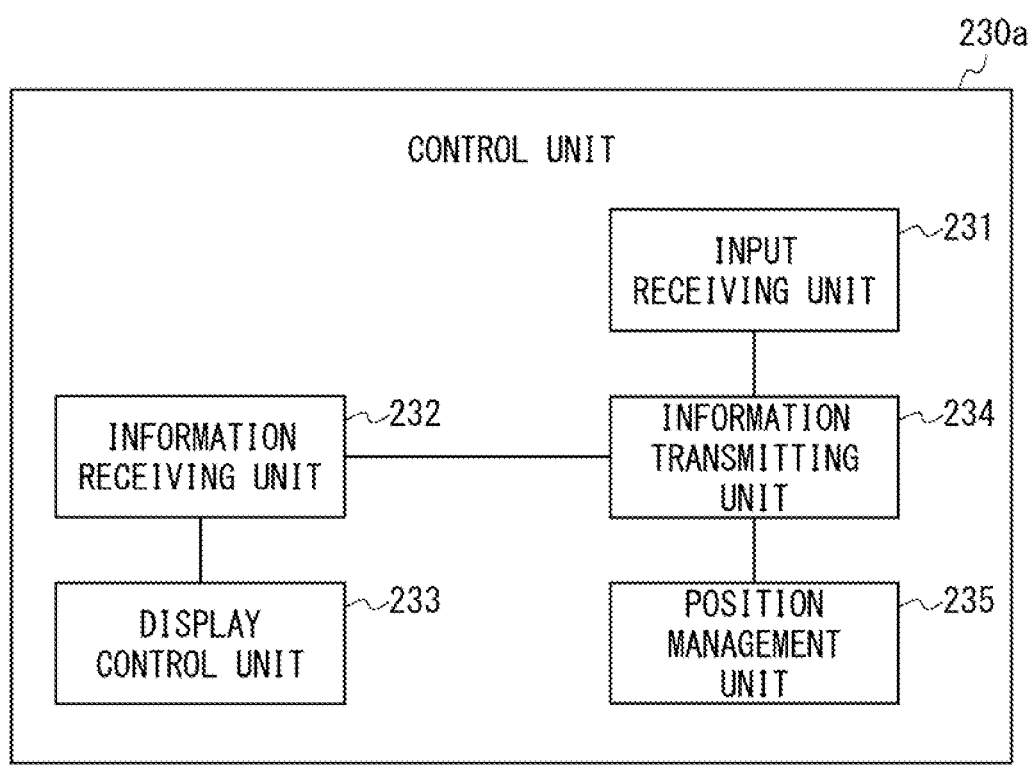
FIG. 19 is a block diagram showing an example of a functional configuration of a control apparatus of a director terminal according to the third example embodiment.

FIG. 18 is a block diagram showing an example of a functional configuration of the control apparatus 110*a*. Further, FIG. 19 is a block diagram showing an example of a functional configuration of the control unit 230*a*. As shown in FIG. 18, the control apparatus 110*a* differs from the control unit 110 shown in FIG. 4 in that the control apparatus 110*a* further includes a position management unit 119. Similarly, the control unit 230*a* differs from the control unit 230 shown in FIG. 11 in that the control unit 230*a* further includes a position management unit 235. Note that the process performed by each of the components of the control apparatus 110*a* is also carried out, for example, by having the processor 153 load a program from the memory 152 and execute the loaded program. Similarly, the process performed by each of the components of the control unit 230*a* is also carried out, for example, by having the processor load a program from the memory and execute the loaded program.

The position management unit 119 of the control apparatus 110*a* and the position management unit 235 of the control unit 230*a* manage position information of each worker (position information of a worker apparatus 100 carried by each worker). The position management unit 119 and the position management unit 235 collectively manage position information of each worker acquired by an arbitrary method. For example, the aforementioned position information may be position information acquired by using GNSS (Global Navigation Satellite System) such as GPS (Global Positioning System), or position information acquired by an arbitrary indoor positioning technology such as beacon positioning, Wi-Fi positioning, or UWB (Ultra Wide Band) positioning.

In this example embodiment, the process that is performed by the information transmitting unit 234 of the control unit 230a (the director terminal 200) when it forwards an emergency notification received by the information receiving unit 232 to worker apparatuses 100 other than the worker apparatus 100 from which this emergency notification has been transmitted differs from that performed in the first example embodiment. In this example embodiment, the information transmitting unit 234 forwards the emergency notification only to a worker apparatus(es) 100 located near the worker apparatus 100 that has transmitted the emergency notification. That is, the information transmitting unit 234 forwards the emergency notification to a worker apparatus(es) 100 carried by a worker(s) who is present within a predetermined range from the worker carrying the worker apparatus 100 from which the emergency notification has been transmitted. In other words, the information transmitting unit 234 forwards the emergency notification to a worker apparatus(es) 100 located within the predetermined range from the point from which the emergency notification has been transmitted (the place of the worker apparatus 100 that has transmitted the emergency notification). To do so, when the information transmitting unit 234 forwards the emergency notification, it refers to the position of each of the workers managed by the position management unit 235 and specifies the worker apparatus(s) 100 to which the information transmitting unit 234 should forward the emergency notification. By doing so, it is possible to notify only a worker(s) who is close to the worker for whom the emergency situation has occurred of the occurrence of the emergency situation. That is, it becomes possible to send the notification only to a worker(s) who can efficiently rush to the worker for whom the emergency situation has occurred. Therefore, workers who are distant from the worker for whom the emergency situation has occurred can concentrate on their original work (i.e., their own work).

In the worker apparatus(c) 100 that has received the emergency notification for the other worker from the director terminal 200, the display control unit 118 performs control so as to display information about this emergency notification on the head-mounted display 124 as being performed in the first example embodiment. Note that the display control unit 118 may display, on the head-mounted display 124, a map in which the position of each worker is shown based on the position information of each worker managed by the position management unit 119. In such a case, the display control unit 118 may display the position of the worker for whom the emergency situation has occurred in a manner different from that for the positions of the other workers so that the position of the worker for whom the emergency situation has occurred can be discriminated (e.g., can be made to stand out). For example, the display control unit 118 may change the color of the point on the map that indicates the position of the worker for whom the emergency situation has occurred from the color of points indicating the positions of workers for whom the emergency situation has not occurred. Further, for example, the display control unit 118 may change the shape of the point on the map that indicates the position of the worker for whom the emergency situation has occurred from the shape of points indicating the positions of workers for whom the emergency situation has not occurred. Further, for example, the display control unit 118 may change the size of the point on the map that indicates the position of the worker for whom the emergency situation has occurred from the size of points indicating the positions of workers for whom the emergency situation has not occurred. Note that the display control unit 118 may change only one of the shape, the color, and the size of the point, or may change two or more of them. Note that these features are merely examples, and an arbitrary method for discriminating the position of the worker for whom the emergency situation has occurred from the positions of workers for whom the emergency situation has not occurred may be performed. By doing so, it becomes possible to easily recognize the position of the worker for whom the emergency situation has occurred. Further, an arbitrary method for discriminating the position(s) of the worker(s) carrying the head-mounted display(s) 124 on which the information is displayed under the control of the display control unit 118 from the positions of the other workers may be performed. In this way, the worker can recognize his/her own position while discriminating his/her own position from the positions of the other workers.

Figure 20:
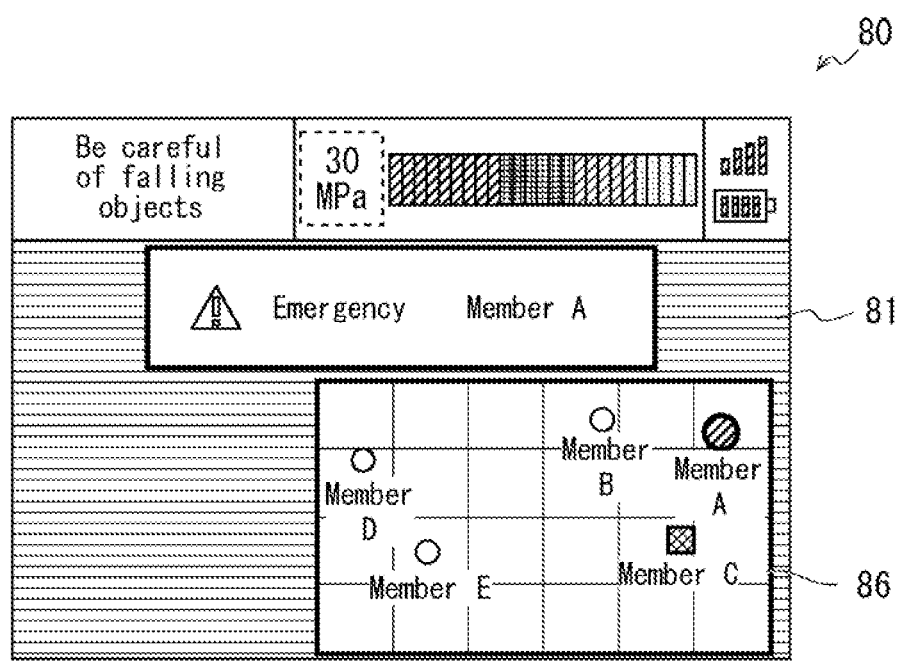
FIG. 20 shows an example of an image of an emergency notification, displayed on a head-mounted display, for reporting the occurrence of an emergency situation for another worker carrying another worker apparatus in a third example embodiment.
Figure 21:
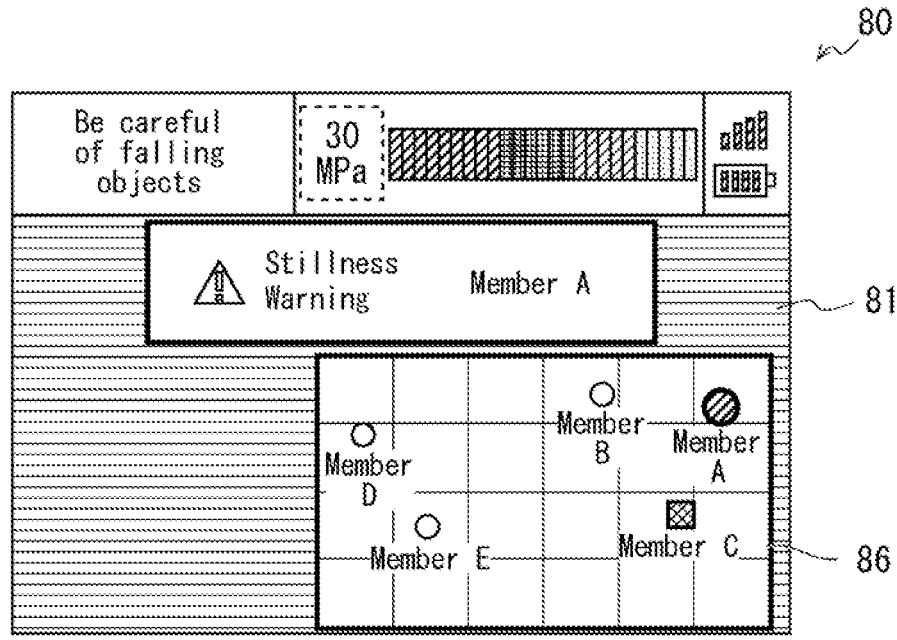
FIG. 21 shows an example of an image of an emergency notification, displayed on a head-mounted display, for reporting the occurrence of an emergency situation for another worker carrying another worker apparatus in the third example embodiment.
Figure 22:
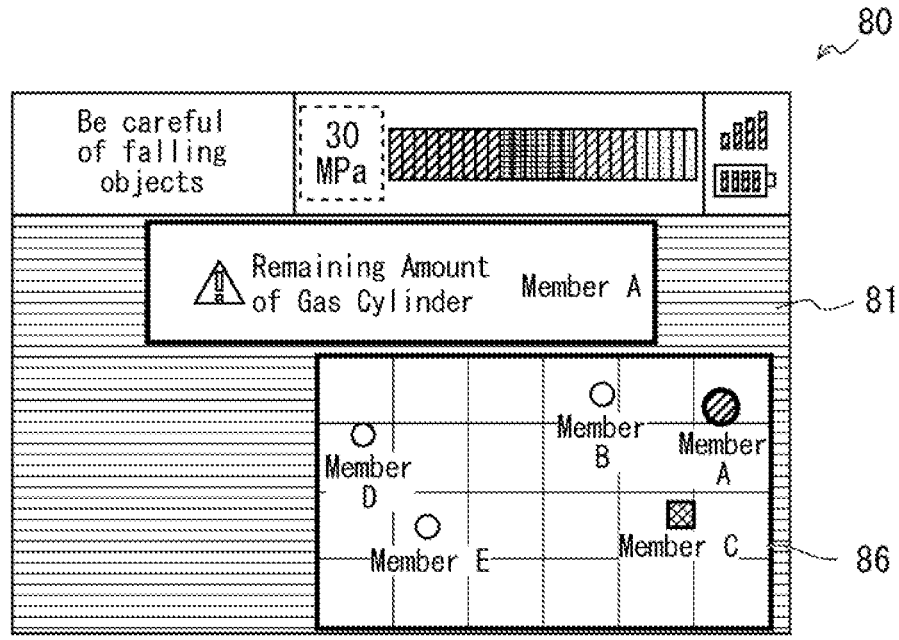
FIG. 22 shows an example of an image of an emergency notification, displayed on a head-mounted display, for reporting the occurrence of an emergency situation for another worker carrying another worker apparatus in the third example embodiment.

Each of FIGS. 20 to 22 shows an example of an image of an emergency notification, displayed on the head-mounted display 124, for reporting the occurrence of an emergency situation for another worker (a member A of the team) carrying another worker apparatus 100 in the third example embodiment. The emergency notification for the member A is transmitted, for example, to members B and C who are present near the member A. Each of FIGS. 20 to 22 is an example of an image displayed on the head-mounted display 124 of a worker (the member C) other than the member A. FIG. 20 is an example of an image displayed on the head-mounted display 124 of the member C when the operation switch 125 is operated by the member A and an emergency notification is thereby transmitted. Further, FIG. 21 shows an example of an image that is displayed on the head-mounted display 124 of the member C when an emergency notification is transmitted because the movement of the member A is in the predetermined movement state. Further, FIG. 22 shows an example of an image that is displayed on the head-mounted display 124 of the member C when an emergency notification is transmitted because the remaining amount of the gas contained in the gas cylinder of the member A has decreased beyond the threshold. In each of the examples shown in FIGS. 20 to 22, the display control unit 118 of the worker apparatus 100 carried by the member C indicates the position of the member C by using a point having a first feature (e.g., a color, a shape, or a size) on a map 86. Further, the display control unit 118 indicates the position of the member A by using a point having a second feature on the map 86, and indicates the positions of workers other than the members C and A by using points having a third feature on the map 86. Note that, in the examples shown in FIGS. 20 to 22, the map 86 is displayed in the taken-image display area 81. That is, in each of the examples shown in FIGS. 20 to 22, the display control unit 118 performs control so as to display the map 86 on the infrared camera video image or the visible-light camera video image of the member C in a superimposed manner. Note that the display control unit 118 may display the map 86 in an area other than the taken-image display area 81.

The third example embodiment has been described above. According to this example embodiment, as described above, it is possible to notify only a worker(s) who is close to the worker for whom an emergency situation has occurred of the occurrence of the emergency situation. Therefore, it becomes possible to send the notification only to a worker(s) who can efficiently rush to the worker for whom the emergency situation has occurred. Note that this example embodiment has been described on the assumption that the display control unit 118 performs control so as to display position information of each worker. However, when the display control unit 118 does not perform control so as to display the position information of each worker, the position management unit 119 may be omitted. Further, although the emergency notification transmitted from the worker apparatus 100 is forwarded to each worker apparatus 100 by the director terminal 200 in this example embodiment, the emergency notification transmitted from the worker apparatus 100 may be directly transmitted to the other worker apparatuses 100. In such a case, the notification transmitting unit 116 of the worker apparatus 100 transmits the emergency notification to other worker apparatuses 100 carried by workers who are present within a predetermined range. In other words, the notification transmitting unit 116 of the worker apparatus 100 transmits the emergency notification to a worker apparatus(es) 100 located within the predetermined range from the point from which the emergency notification has been transmitted (the place of the worker apparatus 100 that has transmitted the emergency notification). Further, this example embodiment may be combined with the second example embodiment. That is, in this example embodiment, the video image of the camera of the worker for whom the emergency situation has occurred may be displayed on the head-mounted display 124 as being performed in the second example embodiment.

Note that the present disclosure is not limited to the above-described example embodiments, and they may be modified as necessary without departing from the scope and spirit of the disclosure. For example, although an operation performed on the operation switch 125, the movement state of a worker, and the remaining amount of the gas contained in the gas cylinder are used as triggers for transmitting an emergency notification in the above-described example embodiments, only one of them may be used as a trigger for transmitting an emergency notification. In such a case, the worker apparatus 100 does not necessarily have to include all of the operation switch 125, the acceleration sensor 130, and the pressure sensor 140. Similarly, the control unit 110 (the control apparatus 110*a*) of the worker apparatus 100 does not necessarily have to include all of the switch operation determination unit 113, the movement determination unit 114, and the gas-cylinder remaining amount determination unit 115.

Further, although the control apparatus 110 (the control apparatus 110*a*) is described as a separate apparatus from the mask 120 in the above-described example embodiments, the control apparatus 110 (the control apparatus 110*a*) may be included in (or incorporated into) the mask 120. As described above, the mask 120 may have the functions of the control apparatus 110 or the control apparatus 110*a*.

The whole or part of the example embodiments disclosed above can be described as, but not limited to, the following supplementary notes.

(Supplementary Note 1)

An information processing apparatus comprising:
   a notification transmitting unit configured to transmit an emergency notification when a predetermined condition is satisfied, the emergency notification being a notification for reporting an occurrence of an emergency situation for a worker; and
   a display control unit configured to perform control so as to display information about the emergency notification on a head-mounted display.

(Supplementary Note 2)

The information processing apparatus described in Supplementary note 1, wherein the display control unit performs control so as to display information indicating that the notification transmitting unit has transmitted the emergency notification on the head-mounted display.

(Supplementary Note 3)

The information processing apparatus described in Supplementary note 2, wherein the display control unit performs control so as to terminate the display of the information indicating that the notification transmitting unit has transmitted the emergency notification based on a response signal transmitted from a destination of the emergency notification transmitted by the notification transmitting unit.

(Supplementary Note 4)

The information processing apparatus described in any one of Supplementary notes 1 to 3, further comprising a receiving unit configured to receive an emergency notification for reporting an occurrence of an emergency situation for a worker carrying another information processing apparatus, wherein
   the display control unit performs control so as to display information indicating the emergency notification for reporting the occurrence of the emergency situation for the worker carrying the other information processing apparatus on the head-mounted display.

(Supplementary Note 5)

The information processing apparatus described in Supplementary note 4, wherein the display control unit further performs control so as to display a video image taken by a camera carried by the worker carrying the other information processing apparatus on the head-mounted display.

(Supplementary Note 6)

The information processing apparatus described in Supplementary note 4 or 5, wherein the display control unit further performs control so as to display a position of the worker for whom the emergency situation has occurred.

(Supplementary Note 7)

The information processing apparatus described in Supplementary note 6, wherein the display control unit performs control so as to display the position of the worker for whom the emergency situation has occurred while discriminating the position of the worker from a position of a worker for whom the emergency situation has not occurred.

(Supplementary Note 8)

The information processing apparatus described in any one of Supplementary notes 1 to 7, wherein the notification transmitting unit transmits an emergency notification to another information processing apparatus carried by a worker present within a predetermined range.

(Supplementary Note 9)

The information processing apparatus described in any one of Supplementary notes 1 to 8, wherein the predetermined condition is that a predetermined operation is performed on a switch provided in a protector worn on a head of the worker carrying the information processing apparatus.

(Supplementary Note 10)

The information processing apparatus described in any one of Supplementary notes 1 to 9, wherein the predetermined condition is that a movement state of the worker carrying the information processing apparatus is a predetermined movement state.

(Supplementary Note 11)

The information processing apparatus described in any one of Supplementary notes 1 to 10, wherein the predetermined condition is that a remaining amount of a gas contained in a gas cylinder carried by the worker carrying the information processing apparatus has decreased beyond a predetermined threshold.

(Supplementary Note 12)

A notification system comprises:

an information processing apparatus carried by a worker; and a director terminal configured to be operated by a director who directs the worker, wherein the information processing apparatus comprises:

a notification transmitting unit configured to transmit an emergency notification to at least the director terminal when a predetermined condition is satisfied, the emergency notification being a notification for reporting an occurrence of an emergency situation for the worker; and a first display control unit configured to perform control so as to display information about the emergency notification on a head-mounted display, and the director terminal comprises:

a receiving unit configured to receive the emergency notification transmitted from the information processing apparatus; and a second display control unit configured to perform control so that the emergency notification received by the receiving unit is displayed on a display.

(Supplementary Note 13)

The notification system described in Supplementary note 12, wherein the director terminal further comprises a forwarding unit configured to forward the emergency notification received by the receiving unit to an information processing apparatus other than the information processing apparatus that has transmitted the emergency notification.

(Supplementary Note 14)

The notification system described in Supplementary note 13, wherein the forwarding unit forwards the emergency notification to an information processing apparatus carried by a worker present within a predetermined range from the worker carrying the information processing apparatus that has transmitted the emergency notification.

(Supplementary Note 15)

A mask comprising:

a head-mounted display;

a notification transmitting unit configured to transmit an emergency notification when a predetermined condition is satisfied, the emergency notification being a notification for reporting an occurrence of an emergency situation for a worker; and a display control unit configured to perform control so as to display information about the emergency notification on a head-mounted display.

(Supplementary Note 16)

A method for processing an emergency notification, comprising:

transmitting an emergency notification when a predetermined condition is satisfied, the emergency notification being a notification for reporting an occurrence of an emergency situation for a worker; and performing control so as to display information about the emergency notification on a head-mounted display.

(Supplementary Note 17)

A non-transitory computer readable medium storing a program for causing a computer to perform:

a notification transmitting step of transmitting an emergency notification when a predetermined condition is satisfied, the emergency notification being a notification for reporting an occurrence of an emergency situation for a worker; and a display control step of performing control so as to display information about the emergency notification on a head-mounted display.

According to the present disclosure, it is possible to provide an information processing apparatus, a notification system, a mask, a method for processing an emergency notification, and a program capable of enabling, when an emergency situation for a worker occurs, the worker to accurately recognize a state of issuance of an emergency notification.

The first to third embodiments can be combined as desirable by one of ordinary skill in the art.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

What is claimed is:

1. An information processing apparatus comprising:
at least one memory storing instructions; and
at least one processor configured to execute the instructions to:
transmit an emergency notification when a predetermined condition is satisfied, the emergency notification being a notification for reporting an occurrence of an emergency situation for a worker; and
perform control so as to display information indicating that the emergency notification has been transmitted on a head-mounted display and to terminate display of the information indicating that the emergency notification has been transmitted based on a response signal transmitted from a destination of the transmitted emergency notification.

2. The information processing apparatus according to claim 1, wherein the emergency notification is a first emergency notification, the emergency situation is a first emergency situation, the worker is a first worker, and the processor is further configured to execute the instructions to:
receive a second emergency notification for reporting an occurrence of a second emergency situation for a second worker carrying another information processing apparatus, and
perform control so as to display information indicating the second emergency notification for reporting the occurrence of the second emergency situation for the second worker carrying the other information processing apparatus on the head-mounted display.

3. The information processing apparatus according to claim 2, wherein the processor is further configured to execute the instructions to perform control so as to display a video image taken by a camera carried by the second worker carrying the other information processing apparatus on the head-mounted display.

4. The information processing apparatus according to claim 2, wherein the processor is further configured to execute the instructions to perform control so as to display a position of the first worker for whom the emergency situation has occurred.

5. The information processing apparatus according to claim 4, wherein the processor is further configured to execute the instructions to perform control so as to display the position of the first worker for whom the emergency situation has occurred while discriminating the position of the worker from a position of a third worker for whom the emergency situation has not occurred.

6. The information processing apparatus according to claim 1, wherein the worker is a first worker, the processor is further configured to execute the instructions to transmit an emergency notification to another information processing apparatus carried by a second worker present within a predetermined range.

7. The information processing apparatus according to claim 1, wherein the predetermined condition is that a predetermined operation is performed on a switch provided in a protector worn on a head of the worker carrying the information processing apparatus.

8. The information processing apparatus according to claim 1, wherein the predetermined condition is that a movement state of the worker carrying the information processing apparatus is a predetermined movement state.

9. The information processing apparatus according to claim 1, wherein the predetermined condition is that a remaining amount of a gas contained in a gas cylinder carried by the worker carrying the information processing apparatus has decreased beyond a predetermined threshold.

10. A method for processing an emergency notification, comprising:
   transmitting, by a processor, an emergency notification when a predetermined condition is satisfied, the emergency notification being a notification for reporting an occurrence of an emergency situation for a worker; and
   performing, by the processor, control so as to display information indicating that the emergency notification has been transmitted on a head-mounted display and to terminate the display of the information indicating that the emergency notification has been transmitted based on a response signal transmitted from a destination of the transmitted emergency notification.

11. A non-transitory computer readable medium storing a program executable by a computer to perform:
   transmitting an emergency notification when a predetermined condition is satisfied, the emergency notification being a notification for reporting an occurrence of an emergency situation for a worker; and
   performing control so as to display information indicating that the emergency notification has been transmitted on a head-mounted display and to terminate the display of the information indicating that the emergency notification has been transmitted based on a response signal transmitted from a destination of the transmitted emergency notification.

* * * * *